United States Patent
Huang et al.

(10) Patent No.: US 12,431,953 B2
(45) Date of Patent: Sep. 30, 2025

(54) INDICATION OF INFORMATION IN CHANNEL STATE INFORMATION (CSI) REPORTING

(71) Applicant: QUALCOMM Incorporated, San Diego, CA (US)

(72) Inventors: Min Huang, Beijing (CN); Chenxi Hao, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/759,868

(22) PCT Filed: Feb. 14, 2020

(86) PCT No.: PCT/CN2020/075247
§ 371 (c)(1),
(2) Date: Aug. 1, 2022

(87) PCT Pub. No.: WO2021/159460
PCT Pub. Date: Aug. 19, 2021

(65) Prior Publication Data
US 2023/0131045 A1    Apr. 27, 2023

(51) Int. Cl.
*H04B 7/06* (2006.01)
*H04B 7/0456* (2017.01)

(52) U.S. Cl.
CPC ......... *H04B 7/0658* (2013.01); *H04B 7/0456* (2013.01); *H04B 7/0626* (2013.01)

(58) Field of Classification Search
CPC ... H04B 7/0456; H04B 7/0626; H04B 7/0658
See application file for complete search history.

(56) References Cited

U.S. PATENT DOCUMENTS

| | | | |
|---|---|---|---|
| 9,532,256 B2 | 12/2016 | Ariyavisitakul et al. | |
| 10,511,363 B2 | 12/2019 | Ibrahim et al. | |
| 2012/0163236 A1* | 6/2012 | Kim | H04L 25/03942 370/254 |
| 2017/0047978 A1 | 2/2017 | Kim et al. | |

(Continued)

FOREIGN PATENT DOCUMENTS

| | | |
|---|---|---|
| CN | 107925464 A | 4/2018 |
| IN | 201737045267 A | 2/2018 |

OTHER PUBLICATIONS

Samsung: "CSI Reporting for Reciprocity-based Operation", R1-1717609, 3GPP TSG RAN WG1 90bis, NR DL CSI Reciprocity, 3rd Generation Partnership Project, Mobile Competence Centre, 650, Route Des Lucioles, F-06921 Sophia-Antipolis Cedex, France, vol. Ran WG1, No., Prague, CZ, Oct. 9, 2017-Oct. 13, 2017, Oct. 8, 2017, XP051340795, p. 2, Para 4, p. 3, Para 5.

(Continued)

*Primary Examiner* — David B Lugo
(74) *Attorney, Agent, or Firm* — Harrity & Harrity LLP

(57) ABSTRACT

Wireless communications systems and methods related to CSI feedback are provided. A user equipment (UE) receives an indication of a restricted set of frequency domain (FD) beamforming components and one or more channel state information reference signals (CSI-RSs). The UE may transmit channel state information (CSI) report indicating a plurality of precoding coefficients based on the received one or more CSI-RSs and the restricted set of FD beamforming components.

29 Claims, 14 Drawing Sheets

(56) References Cited

U.S. PATENT DOCUMENTS

| | | | |
|---|---|---|---|
| 2017/0289966 A1* | 10/2017 | Islam | H04W 72/21 |
| 2018/0062724 A1 | 3/2018 | Onggosanusi et al. | |
| 2018/0091197 A1 | 3/2018 | Huang et al. | |
| 2019/0029026 A1* | 1/2019 | Yun | H04W 72/541 |
| 2019/0103928 A1* | 4/2019 | Nagaraja | H04B 17/309 |
| 2019/0157770 A1 | 5/2019 | Park et al. | |
| 2019/0215046 A1 | 7/2019 | Chen | |
| 2020/0220591 A1* | 7/2020 | Zhang | H04B 7/046 |

OTHER PUBLICATIONS

Supplementary European Search Report—EP20918670—Search Authority—The Hague—Oct. 19, 2023.

3GPP, "3rd Generation Partnership Project, Technical Specification Group Radio Access Network, NR, Physical Layer Procedures Data (Release 15)", 3GPP TS 38.214 V15.1.0, (Mar. 2018) Mar. 31, 2018 (Mar. 31, 2018), 77 Pages.

International Search Report and Written Opinion—PCT/CN2020/075247—ISA/EPO—Nov. 25, 2020.

NTT Docomo: "General Views on Precoding Schemes for Elevation BF and FD-MIMO", 3GPP Draft, 3GPP TSG RAN WG1 Meeting #81, R1-153153, Fukuoka, Japan, May 25-29, 2015, Agenda Item 6.2.5.1, pp. 1-9, section 2.

Samsung: "CSI Reporting for Reciprocity-based Operation", R1-1717609, 3GPP TSG RAN WG1 90bis, NR DL CSI Reciprocity, 3rd Generation Partnership Project, Mobile Competence Centre, 650, Route Des Lucioles, F-06921 Sophia-Antipolis Cedex, France, vol. Ran WG1, No., Prague, CZ, Oct. 9, 2017-Oct. 13, 2017, Oct. 8, 2017, 4 Pages, XP051340795.

* cited by examiner

INDICATION OF INFORMATION IN CHANNEL STATE INFORMATION (CSI) REPORTING

CROSS-REFERENCE TO RELATED APPLICATIONS

The present application is a 35 U.S.C. 371 National Phase entry of Patent Cooperation Treaty (PCT) Application No. PCT/CN2020/075247, filed Feb. 14, 2020. The aforementioned application is hereby expressly incorporated herein by reference in its entirety.

TECHNICAL FIELD

The technology described below relates generally to wireless communication systems, and more particularly channel state information (CSI) reporting operations. Certain embodiments can enable and provide techniques allowing communication devices (e.g., user equipment devices or base stations) to efficiently communicate channel state information (CSI) feedback (e.g., with a minimal overhead).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Channel Status Information (CSI) provides a mechanism for the UE to measure the radio channel quality and report that back to the base station (BS). The BS may transmit a CSI-RS (reference signal) to the UE, which may measure the CSI information and feedback to the BS so that transmitted data can be precoded according to the channel characteristics to better transmit data between the BS and the UE.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS), an indication of a restricted set of frequency domain (FD) beamforming components; receiving, by the UE from the BS, one or more channel state information reference signals (CSI-RSs); and transmitting, by the UE to the BS, a channel state information (CSI) report indicating a plurality of precoding coefficients based on the received one or more CSI-RSs and the restricted set of FD beamforming components.

In an additional aspect of the disclosure, a method of wireless communication includes receiving, by a user equipment (UE) from a base station (BS), an indication of one or more groups of channel state information reference signals (CSI-RS) ports with spatial-frequency beamforming; receiving, by the UE from the BS, one or more CSI-RSs; and transmitting, by the UE to the BS, a channel state information (CSI) report indicating a plurality of precoding coefficients based on the received one or more CSI-RSs and the one or more groups of CSI-RS ports.

In an additional aspect of the disclosure, an apparatus includes a transceiver configured to: receive, by a user equipment (UE) from a base station (BS), an indication of a restricted set of frequency domain (FD) beamforming components; receive, by the UE from the BS, one or more channel state information reference signals (CSI-RSs); and transmit, by the UE to the BS, a channel state information (CSI) report indicating a plurality of precoding coefficients based on the received one or more CSI-RSs and the restricted set of FD beamforming components.

In an additional aspect of the disclosure, an apparatus includes a transceiver configured to receive, by a user equipment (UE) from a base station (BS), an indication of one or more groups of channel state information reference signals (CSI-RS) ports with spatial-frequency beamforming; receive, by the UE from the BS, one or more channel state information reference signals (CSI-RSs); and transmit, by the UE to the BS, a channel state information (CSI) report indicating a plurality of precoding coefficients based on the received one or more CSI-RSs and the one or more groups of CSI-RS ports.

In an additional aspect of the disclosure, a computer-readable medium having program code recorded thereon, the program code including code for causing a user equipment (UE) to receive from a base station (BS), an indication of a restricted set of frequency domain (FD) beamforming components; code for causing the UE to receive from the BS, one or more channel state information reference signals (CSI-RSs)s; and code for causing the UE to transmit to the BS, a channel state information (CSI) report indicating a plurality of precoding coefficients based on the received one or more CSI-RSs and the restricted set of FD beamforming components.

In an additional aspect of the disclosure, a computer-readable medium having program code recorded thereon, the program code including code for causing a user equipment (UE) to receive from a base station (BS), an indication of one or more groups of channel state information reference signals (CSI-RS) ports with spatial-frequency beamforming; code for causing the UE to receive from the BS, one or more channel state information reference signals (CSI-RSs); and code for causing the UE to transmit to the BS, a channel state information (CSI) report indicating a plurality of precoding coefficients based on the received one or more CSI-RSs and the one or more groups of CSI-RS ports.

In an additional aspect of the disclosure, an apparatus includes means for receiving from a base station (BS), an indication of a restricted set of frequency domain (FD) beamforming components; means for receiving from the BS, one or more channel state information reference signals (CSI-RSs); and means for transmitting to the BS, a channel state information (CSI) report indicating a plurality of precoding coefficients based on the received one or more CSI-RSs and the restricted set of FD beamforming components.

In an additional aspect of the disclosure, an apparatus includes means for receiving from a base station (BS), an indication of one or more groups of channel state information reference signals (CSI-RS) ports with spatial-frequency beamforming; means for receiving from the BS, one or more channel state information reference signals (CSI-RSs); and means for transmitting to the BS, a channel state information (CSI) report indicating a plurality of precoding coefficients based on the received one or more CSI-RSs and the one or more groups of CSI-RS ports.

In an aspect of the disclosure, a method of wireless communication includes transmitting, by a base station (BS) to a user equipment (UE), an indication of a restricted set of frequency domain (FD) beamforming components; transmitting, by the BS to the UE, one or more channel state information reference signals (CSI-RSs); and receiving, by the BS from the UE, a channel state information (CSI) report indicating a plurality of precoding coefficients based on the transmitted one or more CSI-RSs and the restricted set of FD beamforming components.

In an additional aspect of the disclosure, a method of wireless communication includes transmitting, by a base station (BS) to a user equipment (UE), an indication of one or more groups of channel state information reference signals (CSI-RS) ports with spatial-frequency beamforming; transmitting, by the BS to the UE, one or more CSI-RSs using the one or more groups of CSI-RS ports; and receiving, by the BS from the UE, a channel state information (CSI) report indicating a plurality of precoding coefficients based on the transmitted one or more CSI-RSs and the one or more groups of CSI-RS ports.

In an additional aspect of the disclosure, an apparatus includes a transceiver configured to: transmit, by a base station (BS) to a user equipment (UE), an indication of a restricted set of frequency domain (FD) beamforming components; transmit, by the BS to the UE, one or more channel state information reference signals (CSI-RSs); and receive, by the BS from the UE, a channel state information (CSI) report indicating a plurality of precoding coefficients based on the transmitted one or more CSI-RSs and the restricted set of FD beamforming components.

In an additional aspect of the disclosure, an apparatus includes a transceiver configured to: transmit, by a base station (BS) to a user equipment (UE), an indication of one or more groups of channel state information reference signals (CSI-RS) ports with spatial-frequency beamforming; transmit, by the BS to the UE, one or more CSI-RSs using the one or more groups of CSI-RS ports; and receive, by the BS from the UE, a channel state information (CSI) report indicating a plurality of precoding coefficients based on the transmitted one or more CSI-RSs and the one or more groups of CSI-RS ports.

In an additional aspect of the disclosure, a computer-readable medium having program code recorded thereon, the program code including code for causing a base station (BS) to transmit to a user equipment (UE), an indication of a restricted set of frequency domain (FD) beamforming components; code for causing the BS to transmit to the UE, one or more channel state information reference signals (CSI-RSs); and code for causing the BS to receive from the UE, a channel state information (CSI) report indicating a plurality of precoding coefficients based on the transmitted one or more CSI-RSs and the restricted set of FD beamforming components.

In an additional aspect of the disclosure, a computer-readable medium having program code recorded thereon, the program code including code for causing a base station (BS) to transmit to a user equipment (UE), an indication of one or more groups of channel state information reference signals (CSI-RS) ports with spatial-frequency beamforming; code for causing the BS to transmit to the UE, one or more CSI-RSs using the one or more groups of CSI-RS ports; and code for causing the BS to receive from the UE, a channel state information (CSI) report indicating a plurality of precoding coefficients based on the transmitted one or more CSI-RSs and the one or more groups of CSI-RS ports.

In an additional aspect of the disclosure, an apparatus includes means for transmitting to a user equipment (UE), an indication of a restricted set of frequency domain (FD) beamforming components; means for transmitting to the UE, one or more channel state information reference signals (CSI-RSs); and means for receiving from the UE, a channel state information (CSI) report indicating a plurality of precoding coefficients based on the transmitted one or more CSI-RSs and the restricted set of FD beamforming components.

In an additional aspect of the disclosure, an apparatus includes means for transmitting to a user equipment (UE), an indication of one or more groups of channel state information reference signals (CSI-RS) ports with spatial-frequency beamforming; means for transmitting to the UE, one or more CSI-RSs using the one or more groups of CSI-RS ports; and means for receiving from the UE, a channel state information (CSI) report indicating a plurality of precoding coefficients based on the transmitted one or more CSI-RSs and the one or more groups of CSI-RS ports.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
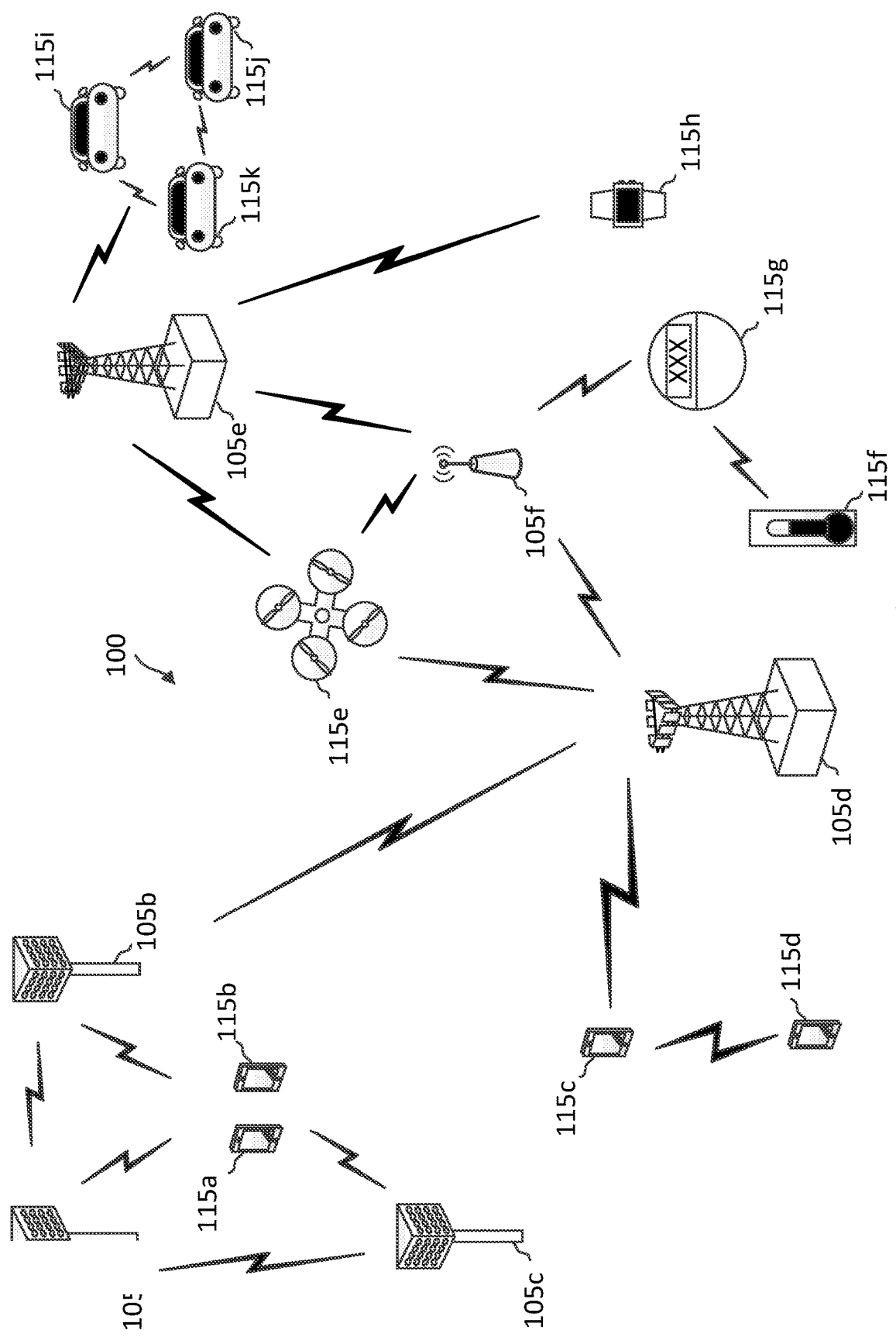
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., —99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A UE and a BS may each include one or more radio frequency (RF) chains, each RF chain can include a precoder and amplification. The precoder relates data to be transmitted with output symbols in accordance with the characteristics of the channels on which the data is transmitted. In general, precoding can take the form of $Y=W \cdot x$, where x represents the symbols to be transmitted, W is a precoding matrix, and Y is the symbols for transmission according to the available resources. In many systems, as discussed below, the precoder can reacts according to the characteristics of a channel. In many systems, the channel can be analyzed to determining the channel characteristics.

In wireless communications, channel state information (CSI) may refer to known channel properties of a communication link. The CSI may represent how a signal may propagate over-the-air from a transmitter to a receiver. The CSI may represent the combined channel effects of, for example, scattering, fading, and/or power decay with distance between the transmitter and the receiver. Channel estimation may be performed to determine these effects on the channel. CSI may be used to adapt transmissions based on the current channel conditions, which may be useful for achieving reliable communication, in particular, with high data rates in multi-antenna systems. CSI is typically estimated at a receiver, quantized, and fed back to a transmitter. CSI may include various feedback information, such as rank indicator (RI), channel quality indicator (CQI), and/or precoding matrix indicator (PMI). CSI may be used report radio channel quality information to the BS.

The UE may receive one or more CSI-RSs from the BS, determine channel properties, determine a plurality of precoding coefficients based on the channel properties, and feedback the precoding coefficients to the BS (e.g., in a CSI report). The BS may receive the plurality of precoding coefficients and apply them for DL beamforming/precoding to provide the UE with the best DL signal quality.

The present disclosure describes mechanisms for transmitting CSI feedback to reduce the CSI payload. In some examples, the BS may utilize codebook-based transmissions to form beam(s) for communication with the UE. A codebook may include a set of FD beamforming components, each identified by an index. An FB beamforming component may also be referred to as an FB basis vector, FD basis, or a basis vector. In some aspects, the BS may restrict the UE to a subset of the FD beamforming components in the codebook. For example, the BS may indicate the restricted subset by indicating the indexes (in various forms) from which the UE can select. By reducing the set of FD beamforming components, complexity and power consumption at the UE may be reduced.

In some aspects, the BS may indicate one or more groups of CSI-RS ports with spatial-frequency beamforming. By indicating the group information of the CSI-RS ports with spatial-frequency beamforming, the CSI reporting accuracy may be improved compared with deriving DL channel status solely by UL sounding, when the DL-UL reciprocity is partial (e.g., in FDD systems or TDD systems where the UL and the DL are not transmitted in the same subbands).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BS 105 and the UE 115 may communicate with each other by utilizing MIMO and beamforming techniques. For instance, the BS 105 may transmit reference signals to the UE 115. The reference signals may be referred to as CSI-RSs and include predetermined pilot symbols so that the UE 115 may estimate a DL channel between the BS 105 and the UE 115. To facilitate beamforming at the BS 105, the UE 115 may feedback CSI (e.g., estimate of the DL channel) to the BS 105. In some aspects, the BS 105 may perform precoding to generate transmission beams with a certain directivity and/or a certain transmit power. The precoding process may include weighting signal phases and/or signal amplitudes at antenna elements of the BS 105.

In some aspects, the BS 105 and the UE 115 may have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. In some examples, the BS 105 may have multi-panel antennas and the UE 115 may have a single-panel antenna. In some other examples, the BS 105 and the UE 115 may each have multi-panel antennas. The BS 205 may form beams in an array of angular directions by weighting signal phases and amplitudes at the antenna elements and may utilize the best beam to communicate with the UE 115. The best beam may refer to a high-quality beam, for example, where the beam may have a highest received signal power among a set of beams measured at the UE 115.

Port Selection in CSI Reporting

In some aspects, the UE 215 may utilize a Type II codebook for CSI feedbacks as described in 3GPP document TS 38.214 Release 15, titled "$3^{rd}$ Generation Partnership Project; Technical Specification Group Radio Access Network; NR; Physical layer procedures for data," December, 2019, Section 5.2.2, which is incorporated herein by reference. The UE 215 may report CSI based on a Type II codebook.

For port selection in certain systems (e.g., Rel-15 NR port selection), the BS 105 may use a beam as the precoder for CSI-RS. The BS may have $N_{tx}$ transmission antennas, and the DL channel response matrix for a certain subband may be denoted as H. By applying a respective beamforming weight (denoted as a column vector w) to each transmission antenna, the BS 105 may generate an antenna port. A CSI-RS port may refer to a port on which a CSI-RS sequence is transmitted. The BS 105 may generate a total of P ports, where $P \leq N_{tx}$. The equivalent DL channel response vector for beamforming weight $w_i$ may be equal to $Hw_i$ at a particular subband. Additionally, for all P ports, the composite equivalent DL channel response matrix may be $H \cdot [w_1, w_2, \ldots, w_P]$, which has P layers. It should be understood that a vector may also be referred to as a component in the present disclosure.

The precoder for a layer on a subband may be given by the following Equation (1):

$$\begin{pmatrix} \sum_{i=0}^{L-1} v_{i_{11}d+i} \cdot p_i^{(1)} \cdot p_i^{(2)} \cdot \phi_i \\ \sum_{i=0}^{L-1} v_{i_{11}d+i} \cdot p_{i+L}^{(1)} \cdot p_{i+L}^{(2)} \cdot \phi_{i+L} \end{pmatrix}, \quad \text{Equation (1)}$$

where ($v_{i_{11}d+i}$) represents a vector, $p_i^{(1)}$ denotes a wideband amplitude value that is common to all subbands, $p_i^{(2)}$ denotes a subband amplitude value that may be different for each subband, and $\varphi_i$ denotes a subband phase value that may be different for each subband. In Equation (1), the top row may represent beamforming components for a first polarization and the bottom row may represent beamforming components for a second polarization.

In this example, the UE 115 may select the CSI-RS ports rather than selecting the beam. Thus, using Equation (1) in the port selection codebook, if the $(i_{11}d+i)$-th entry of the vector $(v_{i_{11}d+i})$ is equal to 1 and the rest are 0s, then the UE 115 may select the $(i_{11}d+i)$-th entry port. With this codebook, there are P ports, where the first half of the ports are for polarization 1 and the other half of the ports are for polarization 2, and the same L ports are applied to both polarizations. The UE 115 may report the preferred candidate L ports via $i_{11}$, where the first candidate L ports may be 0 ... L−1, the second candidate L ports may be d d+L−1, and the last candidate L ports may be $$\left[\frac{P}{2d}\right]d, \ldots, \mathrm{mod}\left(\left[\frac{P}{2d}\right]d + L - 1, \frac{P}{2}\right).$$

In this case, the UE 115 may be restricted to select L consecutive ports (e.g., port $i_{11}$ d+L−1) per subband, potentially reducing the CSI payload. The restriction, however, may lack flexibility and not lead to optimal performance A more flexible selection may lead to a large CSI payload and overhead signaling.

Port Selection with Spatial-Frequency Two-Dimensional (2D) Beamforming in CSI Reporting To overcome the issue of port selection discussed above, the UE 115 may report port selection(s) using a port selection codebook with spatial-frequency 2D beamforming (e.g., Rel-17 NR port selection with spatial-frequency 2D beamforming). For example, with Type II port selection codebook with spatial-frequency beamforming, the UE 115 may transmit a reference signal (e.g., SRS) to the BS 105, which receives the reference signal and generates a number of wideband beamforming ports. For example, the BS 105 may estimate the UL channel status for each subband and determine a number of DL spatial domain (SD) beamforming weight components for each subband based on DL-UL reciprocity. Subsequently, the BS 105 may determine a number of DL frequency domain (FD) beamforming weight components for each SD beamforming weight component based on the corresponding weight values of all subbands. Additionally, the BS 105 may determine a wideband beamforming port by linearly combining a number of weighted wideband beamforming weight components for one or more SD beamforming weight components and one or more FD beamforming weight components, regarded as spatial-frequency 2D beamforming.

The BS 105 may transmit wideband CSI-RSs with the wideband beamforming ports and additionally a CSI report configuration message to the UE 115, where the CSI report configuration message indicates that the CSI report is based on port selection with these CSI-RS ports. The UE 115 may receive the wideband CSI-RSs with the wideband beamforming ports and the CSI report configuration message from the BS 105, select a number of the received wideband CSI-RS ports, and combine them with a respective coefficient for each port. The UE 115 may then report the port selection result and the respective coefficients in the CSI report to the BS 105.

The expression of spatial-frequency 2D beamforming may be expressed in a variety of ways. For example, if a wideband beamforming port uses a transmission antenna with one polarization, the precoding matrix may be generated in accordance with Equation (2):

$$W = \sum_{i=0}^{L-1} \sum_{m=0}^{M-1} b_i \cdot f_m^H d_{i,m}, \qquad \text{Equation (2)}$$

where W is a matrix, L represents a number of SD beamforming weight components, M represents a number of FD beamforming weight components, m represents an index of a set of candidate FD beamforming components (e.g., all possible FD beamforming components), $b_i$ represents a SD beamforming weight component, $f_m$ represents an FD beamforming weight component, and represents a wideband coefficient. Each column of W represents a precoding component (e.g., precoding vector) for a subband. In other examples, these precoding components may be different.

In another example, if a wideband beamforming port uses a transmission antenna with two polarizations, the precoding matrix of each polarization, denoted as $W_1$, $W_2$, has the same form as W. The SD beamforming weight components $\{b_i\}$ and FD beamforming weight components $(f_m)$ may be identical or different between these two polarizations.

In some aspects, the CSI-RS port precoding and selection may be polarization-common or polarization-specific. For polarization-common port-selection, the same port may be used for each polarization. In some examples, the BS 105 may use the same precoder on corresponding ports in the different polarization. In some examples, the UE 115 assumes an organization of the CSI-RS. The organization may be configured by the BS 105 or specified in a wireless standard.

For polarization-common port-selection, a first half of CSI-RS ports may use transmission antennas on polarization 1 and the other half of CSI-RS ports may use transmission antennas on polarization 2, where these two polarizations may have the same SD beamforming weight components; although other uneven splits of the ports could be done for the polarizations. It may be precoded (port-wise) similar to the second half of the CSI-RS ports.

With polarization-common port-selection, the PMI for a layer on any of the $N_3$ FD units may be provided in accordance with Equation (3):

$$\begin{pmatrix} \sum_{k=0}^{K_0/2-1} v_{i_k} \cdot c_k \\ \sum_{k=0}^{K_0/2-1} v_{i_k} \cdot c_{k+k_0/2} \end{pmatrix}, \qquad \text{Equation (3)}$$

where $v_{i_k}$ is of size $$\frac{P}{2} \times 1$$

with only one "1" in row $i_k$ (if there is only one "1" in row $i_k$, then the $i_k$-th port is selected on all $N_3$ FD units), where P is the total number of CSI-RS ports, $c_k$ represents the linear combination coefficient associated with port $i_k$ on polarization 1 (which is a wideband coefficient), $c_{k+k_0/2}$ represents the linear combination coefficient associated with port $i_k$ on polarization 2 (which is a wideband coefficient), and $K_0/2$ represents a number of CSI-RS ports that the UE may use to generate the linear combination for computing the PMI in equation (3). The UE 115 may report CSI-RS ports $i_0, \ldots i_{k_0/2-1}$ and port coefficients $c_0, \ldots c_{k_0-1}$ or a subset of port coefficients $c_0, c_{k_0-1}$, where the unreported port coefficients are set to 0.

For polarization-specific port-selection, the BS 105 may use different precoders on CSI-RS ports in the different polarization. For example, a first portion of CSI-RS ports (e.g., 20 CSI-RS ports) may use transmission antennas on polarization 1, and a second portion of CSI-RS ports (e.g., 12 CSI-RS ports) may use transmission antennas on polarization 2. In some examples, the UE 115 may select any of the CSI-RS ports for combining.

With polarization-specific port-selection, the PMI for a layer on any of the $N_3$ FD units may be provided in accordance with Equation (4):

$$\sum_{k=0}^{k_0-1} v_{i_k} \cdot c_k, \qquad \text{Equation (4)}$$

where $v_{i_k}$ is of size P×1 with only one "1" in row $i_k$ (the $i_k$-th port is selected on all $N_3$ FD units), where P is the total number of CSI-RS ports, $c_k$ represents the linear combination coefficient associated with port $i_k$, and $K_0$ represents a number of CSI-RS ports that the UE uses to generate the linear combination for computing PMI in equation (4). The UE 115 may report CSI-RS ports $i_0, \ldots i_{k_0-1}$ and port coefficients $c_0, \ldots c_{k_0-1}$ or a subset of port coefficients $c_0, c_{k_0-1}$, where the unreported port coefficients are set to 0.

Accordingly, use of the port selection codebook with spatial-frequency 2D beamforming discussed in Rel-17 may reduce the CSI feedback payload compared to the Rel-15 NR port selection because, for example, the UE 115's reported port selection result is for wideband usage rather than for each subband usage. Additionally, use of the port selection codebook with spatial-frequency 2D beamforming discussed in Rel-17 may improve CSI report accuracy compared with deriving DL channel status solely by UL sounding, when the DL-UL reciprocity is impartial (e.g., in FDD systems or in TDD systems, where UL and DL are not transmitted on the same subbands).

Frequency Compression in CSI Reporting

To overcome the issue of large amounts of CSI overhead signaling discussed above, the UE 115 may report port selection(s) using a Type II candidate with frequency compression (e.g., Rel-16 NR). For example, with Type II codebook or Type II port selection codebook with FD compression, the UE 115 may be configured to report FD compressed precoder feedback to reduce overhead of the CSI report.

In some examples, the BS 105 transmits CSI-RS to the UE 115, which determines the PMI and transmits a CSI report based on the received CSI-RS to the BS 105. With codebook operation with FD compression for one layer, the UE 115 may exploit the sparsity of both spatial and frequency domains by determining a compressed Type II precoder W in accordance with Equation (5):

$$W = W_1 \times \tilde{W}_2 \times W_f^H, \qquad \text{Equation (5)}$$

where W represents a compressed Type II precoder, $W_1$ is a matrix and represents the SD beamforming component including L beams (e.g., L columns) per polarization group (e.g., a hence a total of 2L beams), $\tilde{W}_2$ is a matrix and includes a plurality of candidate linear combination coefficients (e.g., all the required linear combination coefficients) (including amplitude and phase), where each element represents the coefficient of a tap for a beam, and $W_f^H$ is a matrix composed of the components (each row is a component) used to perform compression in the FD. The components in $W_f$ may be derived from a certain number of columns in a discrete Fourier transform (DFT) matrix.

The UE 115 may report the quantization results of $W_1$, $\tilde{W}_2$, and $W_f^H$ for all layers as PMI. With Type II port selection codebook with frequency compression, if the BS 105 uses one or more SD beamforming components at the CSI-RS ports, then the UE 115 may determine and report only $\tilde{W}_2$ and $W_f^H$. In this example, the UE 115 may not be requested to determine and report the SD beamforming component matrix $W_1$.

Channel Estimation and Port Selection

The UE 115 may have some difficulty estimating the channel or selecting ports. For example, with Type II codebook with FD compression (with or without port selection), the BS 105 does not provide any information or restriction for the UE to report the FD beamforming components in $W_f$. The UE 115 may transmit SRS to the BS 105, which may derive information on the radio channel from the SRS. It may be desirable for the BS 105 to provide some guidance for the UE 115 to select the FD beamforming components. In doing so, the UE 115 can be assisted to determine optimal FD beamforming components. Additionally, calculation complexity may be reduced at the UE 115 as a result of having a smaller subset of FD beamforming components from which to select, potentially saving energy at the UE 115.

Additionally, with Type II port selection codebook with spatial-frequency beamforming, for either polarization-common port selection or polarization-specific port selection, the UE 115 may estimate the channel gain for each received CSI-RS port, select a number of the CSI-RS ports, and combine them with a respective coefficient to each port. The FD beamforming components that are used by the BS 105 may be unknown to the UE 115. On one hand, the power delay profile of the FD beamformed channel may be moved or shifted compared with the one without FD beamforming, potentially causing difficulty for the UE 115 to determine which time-domain window in the power delay profile should be adopted. Accordingly, channel estimation performance may be worse in this scenario than in a case without FD beamforming. On the other hand, without information of FD beamforming, it may be difficult for the UE 115 to determine or restore the non-beamformed channel response matrix, potentially causing difficulty for the UE 115 to select the optimal ports and determine the port combination coefficients that may lead to the maximum combined beamforming gain. It may be desirable for the BS 105 to indicate information about the spatial-frequency 2D beamforming in the CSI-RS port generation so that the UE 115 can improve channel estimation performance and derive a better or the best port selection result and port combination coefficients.

CSI Reporting Framework

Figure 2:
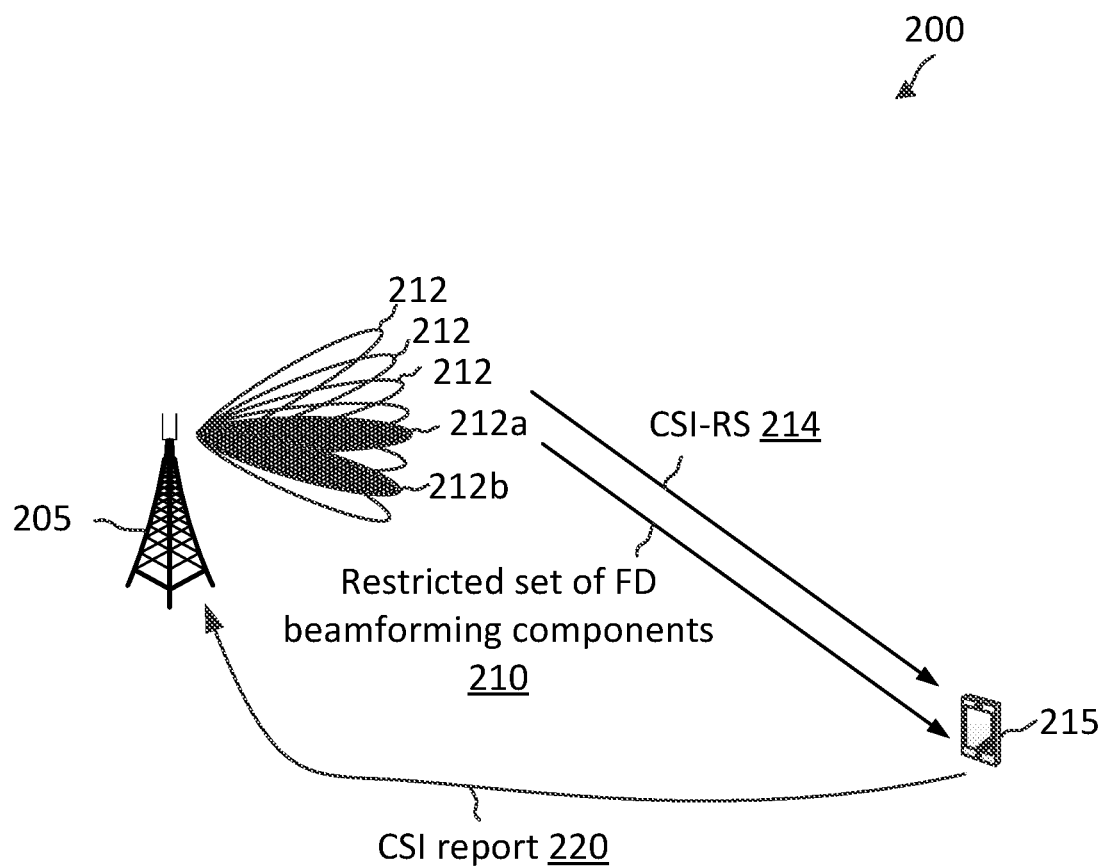
FIG. 2 illustrates a wireless communication network that implements channel state information (CSI) reporting according to one or more aspects of the present disclosure.

FIG. 2 illustrates a wireless communication network 200 that implements CSI reporting according to one or more aspects of the present disclosure. The network 200 may correspond to a portion of the network 100. FIG. 2 illustrates a BS 205 in communication with a UE 215 for purposes of simplicity of discussion, though it will be recognized that embodiments of the present disclosure may scale to many more UEs 215 and/or BSs 205. The UE 215 may be similar to the UEs 115, and the BS 205 may refer to the BSs 105. The BS 205 may include a radio frequency (RF) frontend configured for wireless signal transmissions and receptions.

As discussed above, the BS 205 may utilize codebook-based transmissions to form beam(s) 212 for communication with the UE 215. For instance, the BS 205 may perform precoding to generate the beams 212a and 212b based on a codebook. The codebook may be in the form of a matrix or matrices, which may include the selection of beams, the selection of weights for scaling amplitudes and/or phases at antenna elements of the BS 205 and/or at the antenna ports of the BS 205. In some instances, antenna ports may be virtual antenna ports, which may or may not have a direct mapping to physical antenna elements at the BS 205. In some instances, the codebook may have a codebook structure (e.g., single or dual) including a wideband matrix and/or a frequency-selective subband matrix. The codebook may be a predetermined or preconfigured codebook known to the BS 205 and the UE 215.

In the illustrated example of FIG. 2, the best beams 212 from the BS 205 to the UE 215 may correspond to the beam 212a and the beam 212b (shown by the pattern-filled beams) In some instances, the beam 212a and/or 212b may reach the UE 215 via a direct line-of-sight (LOS) path. In some instances, the beam 212a and/or 212b may reach the UE 215 via a non-direction LOS path, for example, scattering off a certain scatter or clusters in the environment. The UE 215 may select the best beams 212a and 212b, weightings for the amplitudes and/or phases for the beams 212a and 212b from the codebook.

The UE 215 may potentially select any of the candidate FD beamforming components (e.g., indexes) from a codebook. Selection of a FD beamforming component may also refer to selection of an index corresponding to the FD beamforming component. An index corresponds to an FD beamforming component if, for example, the index references or identifies the FD beamforming component. To facilitate the UE 215 in selecting the best beam(s) 212 (e.g., to determine optimal FD beamforming components) and/or reduce calculation complexity at the UE 215, the BS 205 may restrict the UE 215 to select a subset of the candidate FD beamforming components from the codebook. In some aspects, the BS 205 may transmit an indication of a restricted set of FD beamforming components 210 to the UE 215. The BS 205 may transmit the indication of the restricted set of FD beamforming components 210 via, for example, an RRC signaling message, a MAC control element (MAC CE), and/or in DCI.

Additionally, the BS 205 may transmit a set of CSI-RS 214 using one or more beams 212 to the UE 215. Each of the CSI-RSs 214 may include a predetermined sequence or a sequence of predetermined pilot symbols. The BS 205 may transmit the CSI-RS 214 at configured time and frequency locations and use one or more configured beams 212. Additionally, the BS 205 may transmit the CSI-RS 214 using different beams 212 at different time and frequency and/or different combinations of beams 212 at different time and frequency. The BS 205 may configure the UE 215 with the configured time and frequency resources and the configured beam(s) 212 for the transmission of the CSI-RS 214.

The UE 215 may receive the indication of the restricted set of FD beamforming components 210 and the CSI-RS(s) 214. The UE 215 may perform measurements on the CSI-RS(s) 214, determine channel properties based on the CSI-RS(s) 214, and determine a plurality of precoding coefficients based on the channel properties. For example, the UE 215 may determine the plurality of precoding coefficients based on the restricted set of FD beamforming components 210 and the CSI-RS(s) 214. The UE 215 may feedback the plurality of precoding coefficients to the BS 205, which may apply the precoding coefficients for DL beamforming/precoding to provide the UE 215 with the best DL signal quality. For example, the UE 215 may transmit a CSI report 220 indicating the plurality of precoding coefficients to the BS 205.

FD Beam Forming Component

An FD beamforming component may include a variety of vectors. For example, an FD beamforming component may include a discrete Fourier transform (DFT) vector. The BS 205 may determine a beamforming weight for the DFT vector in accordance with Equation (6) below:

$$f_m = \frac{1}{\sqrt{N}}\left[1, e^{-j\frac{2\pi m \cdot 1}{N}}, \ldots, e^{-j\frac{2\pi m \cdot (N-1)}{N}}\right], \quad \text{Equation (6)}$$

where N represents a number of subbands or a number of FD beamforming components included in a plurality of FD beamforming components, $S$ represents a complete set of indexes of the plurality of FD beamforming components, and m represents an index of the plurality of FD beamforming components (e.g., $m \in S = \{0, 1, \ldots, N-1\}$). The plurality of FD beamforming components may include a set of all possible FD beamforming components or indexes (e.g., in a codebook), and the restricted set of FD beamforming components 210 may be a subset of the plurality of FD beamforming components. Additionally, the number of subbands may be equal to the number of FD beamforming components.

In another example, an FD beamforming component may include a discrete cosine transform (DCT) vector. The BS 205 may determine a beamforming weight for the DCT vector in accordance with Equation (7) below:

$$f_m = \sqrt{\frac{2}{N}}\left[\cos\frac{\pi(2m+1)\cdot 1}{4N}, \cos\frac{\pi(2m+1)\cdot 3}{4N}, \ldots, \cos\frac{\pi(2m+1)\cdot 2((N-1))+1}{4N}\right], \quad \text{Equation (7)}$$

where N represents a number of subbands or a number of FD beamforming components included in a plurality of FD beamforming components, $S$ represents a complete set of indexes of the plurality of FD beamforming components, and m represents an index of the plurality of FD beamforming components (e.g., $m \in S = \{0, 1, \ldots, N-1\}$). The plurality of FD beamforming components may include a set of all possible FD beamforming components or indexes (e.g., in a codebook), and the restricted set of FD beamforming components 210 may be a subset of the plurality of FD beamforming components. Additionally, the number of subbands may be equal to the number of FD beamforming components.

Indication of One or More Discrete Indexes of FD Beamforming Components (Consecutive and/or Nonconsecutive Indexes)

The BS 205 may transmit the indication of the restricted set of FD beamforming components 210 in a variety of ways. The BS 205 may transmit the indication by transmitting a set of indexes of the restricted set of FD beamforming components 210 for a number of CSI-RS ports, where each CSI-RS port corresponds to an FD beamforming component with a respective index of the set of indexes. The BS 205 may transmit the restricted set of FD beamforming components 210 by transmitting one or more discrete indexes of FD beamforming components, where the one or more discrete indexes corresponds to the restricted set of FD beamforming components.

In some aspects, the one or more discrete indexes may include consecutive indexes of the FD beamforming components and/or may include nonconsecutive indexes of the FD beamforming components. In an example, the BS 205 may transmit the indication of the one or more discrete indexes by transmitting an indication of a bitmap to the UE 215. Each bit having a first value in the bitmap may correspond to an index included in the one or more discrete indexes, and each bit having a second value in the bitmap may correspond to an index that is not included in the one or more discrete indexes. In this example, the BS 205 may indicate a bitmap with a length of N bits, whose respective bit represents whether the corresponding index is included in the $\mathcal{S}$ ' or not, or may indicate the values of selected indexes one-by-one, where N represents a number of subbands or a number of FD beamforming components included in a plurality of FD beamforming component, where $\mathcal{S}$ ' represents the set of restricted FD basis indexes, and the indexes in $\mathcal{S}$ ' are not necessarily consecutive (e.g., $\mathcal{S}' \subseteq \mathcal{S}$). A codebook may include a set of FD basis, each identified by an index. The BS 205 may restrict the UE 215 to a subset of the FD basis in the codebook. The BS 205 may indicate the restricted subset by indicating the indexes (in various forms) from which the UE 115 may select. The plurality of FD beamforming components may include a set of all possible FD beamforming components or indexes (e.g., in a codebook), and the restricted set of FD beamforming components 210 may be a subset of the plurality of FD beamforming components.

Additionally or alternatively, the BS 205 may transmit the indication of the one or more discrete indexes by transmitting an indication of a first number of FD beamforming components included in the restricted set of FD beamforming components 210 and transmitting an integer that is less than or equal to a combinational value. The first number may be denoted as N', the combinational value may represent a number of possible results to select N' indexes out of the set of $\mathcal{S}$ (with a total of N indexes), and $\mathcal{S}$ may represent a complete set of indexes of a plurality of FD beamforming components. The plurality of FD beamforming components may include a set of all possible FD beamforming components or indexes (e.g., in a codebook), and the restricted set of FD beamforming components 210 may be a subset of the plurality of FD beamforming components.

In some aspects, the BS 205 determines the combinational value in accordance with Equation (8) below:

$$C_N^{N'} = \frac{N!}{N'!(N-N')!},\qquad \text{Equation (8)}$$

where N represents a size of the plurality of FD beamforming components, N' represents the first number of FD beamforming components, and each integer from (0 to $C_N^{N'}-1$) represents a result of selecting the first number of FD beamforming components (N') from the plurality of FD beamforming components ($\mathcal{S}$). The plurality of FD beamforming components may be the set of all possible FD beamforming components (e.g., in a codebook).

Additionally, a number of quantization bits may be provided in accordance with Equation (9) below:

$$\lceil \log_2 C_N^{N'} \rceil,\qquad \text{Equation (9)}.$$

Indication of an Index Window Spanning Consecutive Indexes

In some aspects, the BS 205 transmits the restricted set of FD beamforming components 210 by transmitting an indication of an index window including a start index and an end index. The index window may span a number of consecutive indexes of the FD beamforming components, and the index window may correspond to the restricted set of FD beamforming components 210. In this example, the indexes in $\mathcal{S}$ ' may be consecutive, where $\mathcal{S}$ ' represents an index of the restricted set of FD beamforming components 210, x represents the start index, $0<=x<=N-1$, z represents the end index, $0<=z<=N-1$. If x=z, the restricted set of FD beamforming components 210 includes only one index x of the FD beamforming component. If x<z, the restricted set of FD beamforming components 210 includes the indexes from x to z. If x>z, the restricted set of FD beamforming components 210 includes the indexes from 0 to z and from x to N−1.

In some aspects, the BS 205 transmits the restricted set of FD beamforming components 210 by transmitting an indication of an index window including a start index and a length value. The index window may span a number of nonconsecutive indexes of the FD beamforming components, and the index window may correspond to the restricted set of FD beamforming components 210. The indication of the restricted set of FD beamforming components 210 may be determined in accordance with Equation (10) below:

$$\mod(x+i-1,N),\qquad \text{Equation (10)}.$$

where $1<=i<=y$, i represents an index in the restricted set of FD beamforming components 210, the expression mod( ) means the operation of modulo, N represents a size of a plurality of FD beamforming components (e.g., the set of all possible FD beamforming components), x represents the start index, $0<=x<=N-1$, and y represents the length value, $1<=y<=N$. Additionally, the indexes in $\mathcal{S}$ ' may be consecutive, where $\mathcal{S}$ ' represents an index of the restricted set of FD beamforming components 210.

Indication of Restricted Set of FD Beamforming Components in Relation to SD Beamforming Components and Multiple Transmission Layers In some aspects, the BS 205 may transmit one or more CSI-RSs using one or more CSI-RS ports belonging to T layers, where T is an integer number greater than 0. The BS 205 may transmit the indication of the restricted set of FD beamforming components by indicating a FD beamforming component restriction set $\mathcal{S}$ ' for a number of CSI-RS ports, each of which is generated by or corresponds to an FD beamforming component with a respective index in $\mathcal{S}$ ', and where $\mathcal{S}$ ' represents an index of the restricted set of FD beamforming components. The UE 215 may receive from the BS 215, the one or more CSI-RSs based on the one or more CSI-RS ports (used by the BS 205) belonging to T layers and may receive the indication of the FD beamforming component restriction set $\mathcal{S}$ ' for the number of CSI-RS ports.

In some aspects, the BS 205 may indicate the SD beamforming components the restricted set of FD beamforming components, for example, for each SD beamforming component, for all SD beamforming components of each layer of the T layers, and/or for all SD beamforming components of all T layers. The UE 215 may receive from the BS 215, the one or more CSI-RSs based on the one or more CSI-RS ports (used by the BS 205) belonging to T layers and may receive the indication of the SD beamforming components for one or more of the T layers.

Figure 3A:
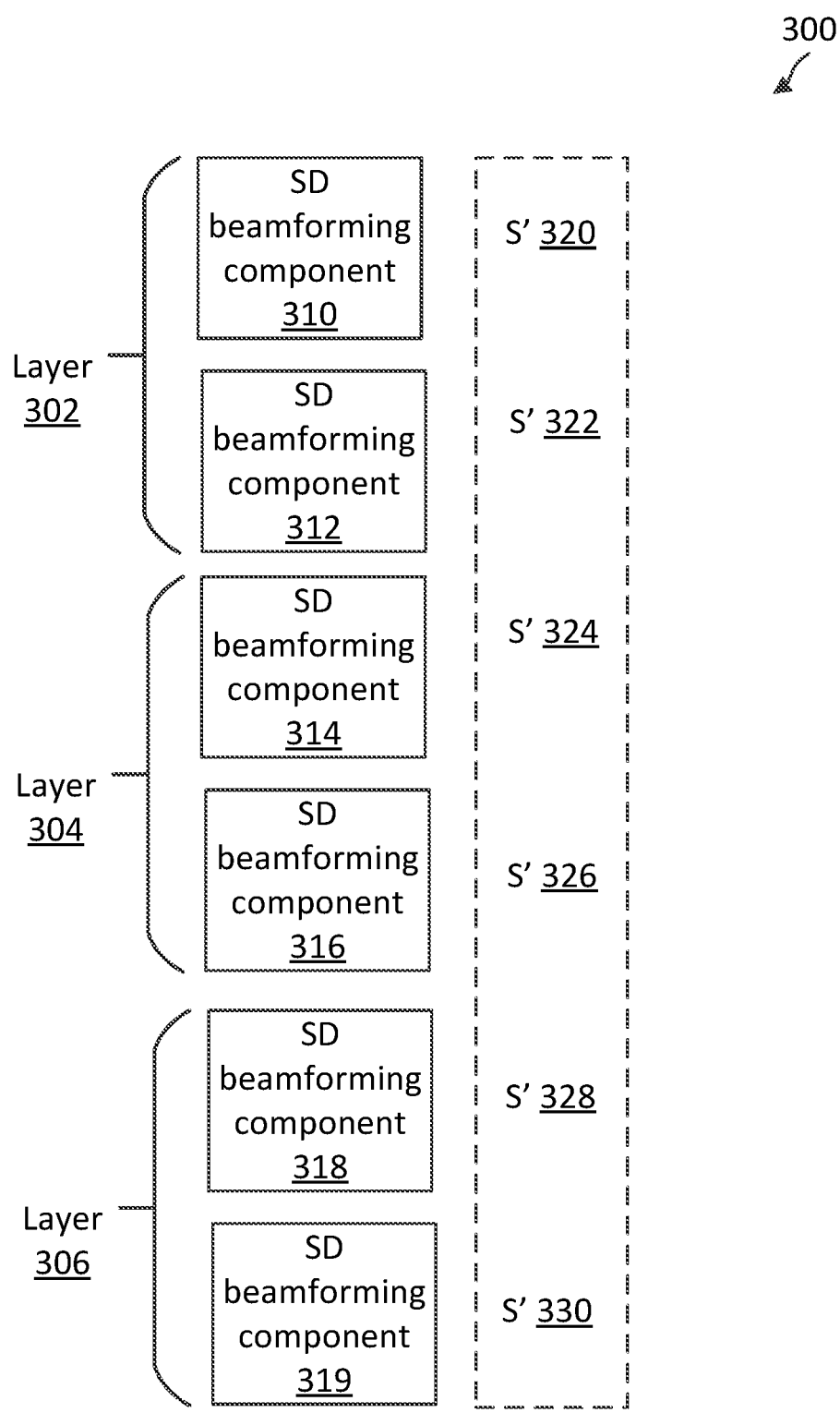
FIGS. 3A-3C are diagrams illustrating various communication schemes for indicating a restricted set of frequency domain (FD) beamforming components for one or more layers according to one or more aspects of the present disclosure.
Figure 3B:
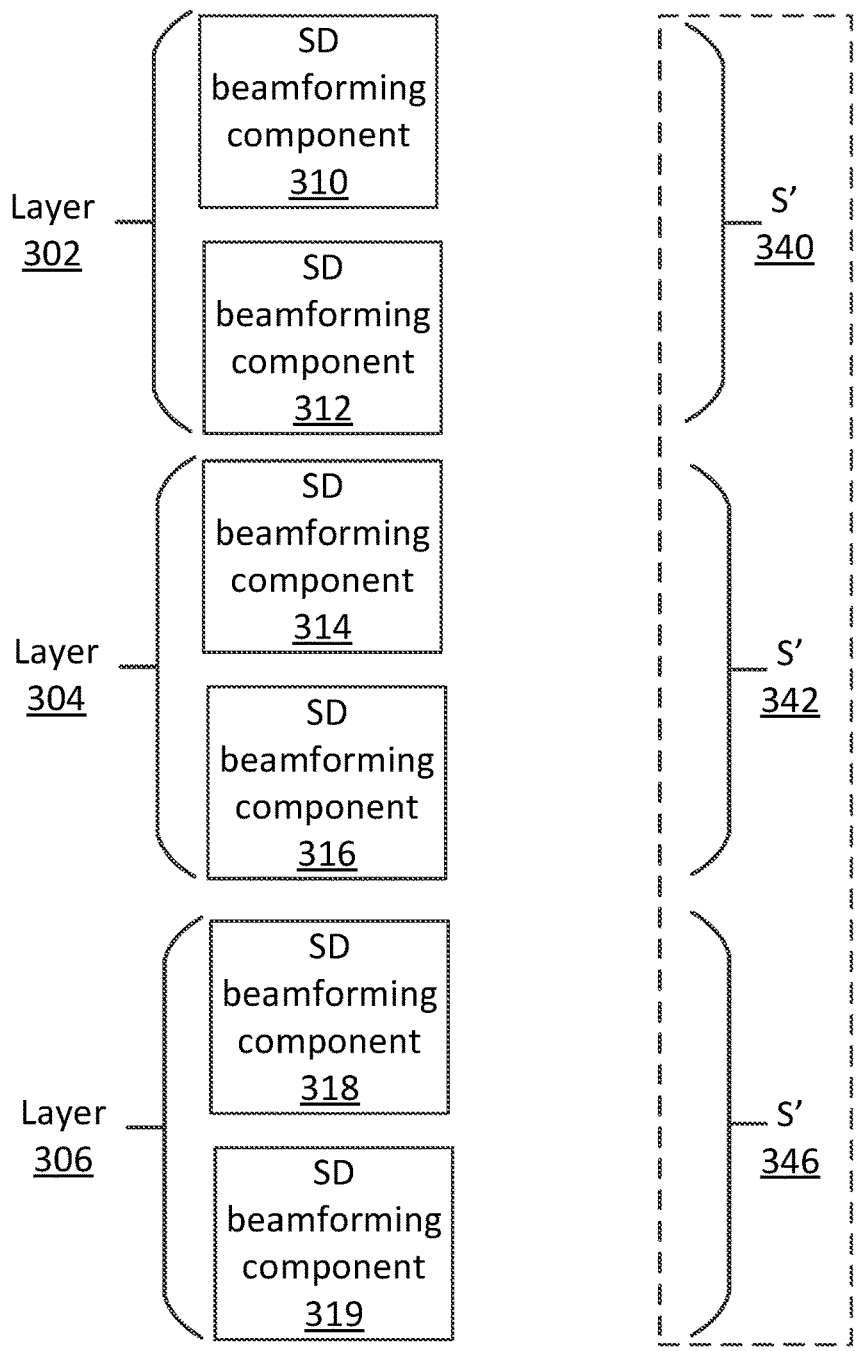
Figure 3C:
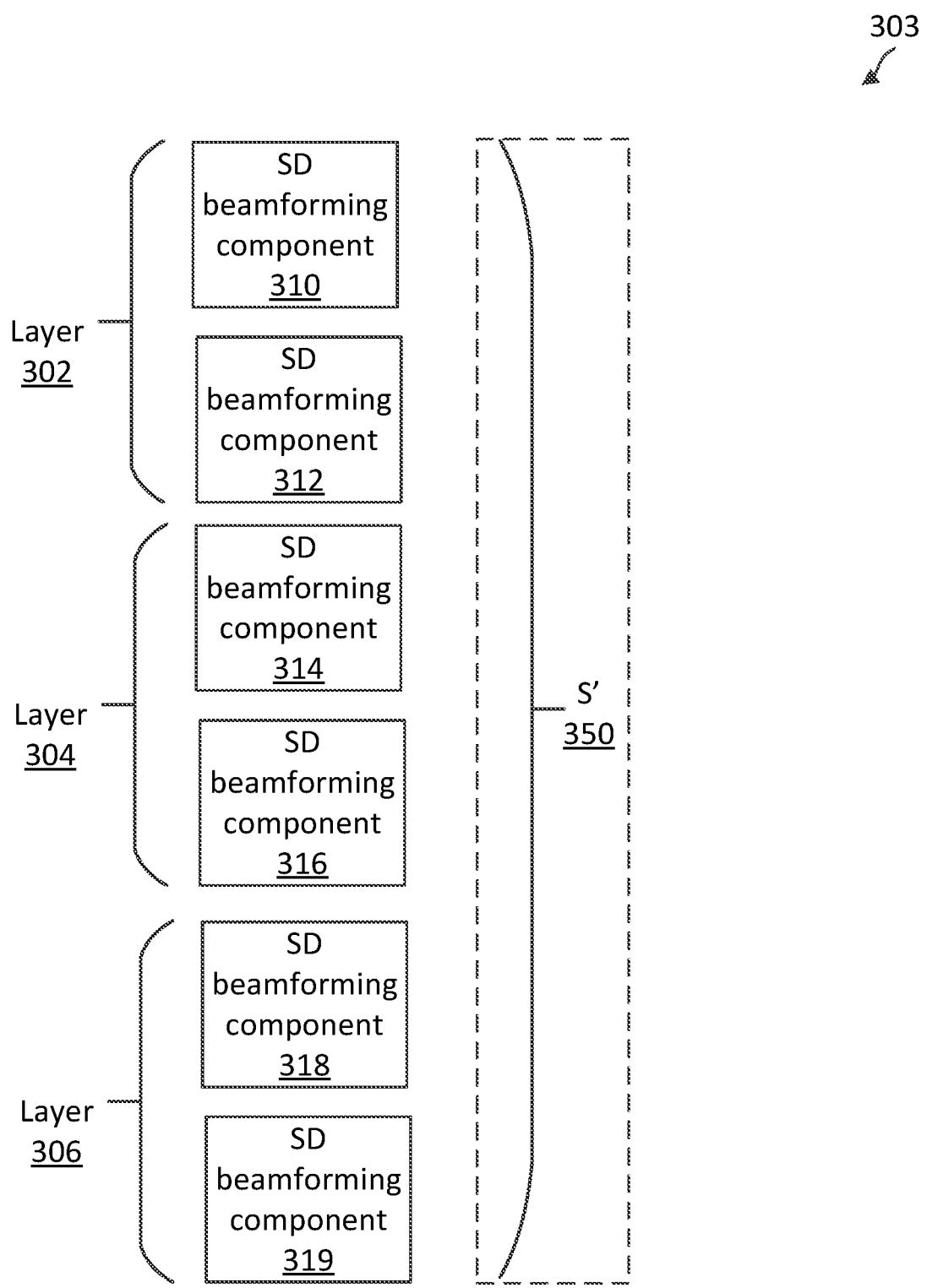

FIGS. 3A-3C are diagrams illustrating various communication schemes for indicating the restricted set of FD beamforming components for one or more layers according to one or more aspects of the present disclosure. Aspects of FIGS. 3A-3C may be implemented between a UE (e.g., UEs 115, 215 415, 515, 615 and/or 700) and a BS (e.g., BS 105, 205, 405, 505, 605, and/or 800) located in a network (e.g., network 100). The various communication schemes may employ similar transmission and/or reporting mechanisms as described with respect to FIG. 1, 2, 4, 5, 6, 7, 8, 9, 10, 11, and/or 12 and may reuse the same parameter representations as described in the present disclosure.

In FIGS. 3A-3C, the BS 205 may transmit CSI-RSs using CSI-RS ports belonging to three layers (T=3), which include a layer 302, a layer 304, and a layer 306. The BS 205 may transmit one or more CSI-RSs using two SD beamforming components including an SD beamforming component 310 and using an SD beamforming component 312 in the layer 302. Additionally, the BS 205 may transmit one or more CSI-RSs using two SD beamforming components including an SD beamforming component 314 and using an SD beamforming component 316 in the layer 304. Additionally, the BS 205 may transmit one or more CSI-RSs using two SD beamforming components including an SD beamforming component 318 and using an SD beamforming component 319 in the layer 306. It should be understood that any two SD beamforming components may correspond to different restricted subsets at different layers.

Although three layers are shown, it should be understood that in other examples the BS 205 may transmit the CSI-RS in fewer than three or more than three layers (e.g., one layer, two layers, four layers, etc.). Additionally, although two SD beamforming components are illustrated as being transmitted in each layer, it should be understood that in other examples the BS 205 may transmit more than two or fewer than two SD beamforming components per layer. In some examples, the SD beamforming components (e.g. SD beamforming component 310 and SD beamforming component 312) at different layers are the same.

In FIG. 3A, the BS 205 uses a communication scheme 300 to transmit an indication of a respective restricted set of FD beamforming components for each SD beamforming component. In the scheme 300, the BS 205 may transmit an indication that the CSI-RS ports belong to three layers, each of which has two SD beamforming components. For each layer of the T layers, the BS 205 may transmit the indication of the restricted set by transmitting a respective restricted set for each SD beamforming component of the number of SD beamforming components in the respective layer. For example, for the layer 302, the BS 205 may indicate the SD beamforming component 310 by transmitting a first restricted set $S'320$ and may indicate the SD beamforming component 312 by transmitting a second restricted set $S'322$ to the UE 215. Additionally, for the layer 304, the BS 205 may indicate the SD beamforming component 314 by transmitting a third restricted set $S'324$ and may indicate the SD beamforming component 316 by transmitting a fourth restricted set $S'326$ to the UE 215. Additionally, for the layer 306, the BS 205 may indicate the SD beamforming component 318 by transmitting a fifth restricted set $S'328$ and may indicate the SD beamforming component 319 by transmitting a sixth restricted set $S'330$ to the UE 215.

In FIG. 3B, the BS 205 uses a communication scheme 301 to transmit an indication of a respective restricted set of FD beamforming components for all SD beamforming components of each layer of the T layers. In the scheme 301, the BS 205 may transmit an indication that the CSI-RS ports belong to three layers. For each layer of the T layers, the BS 205 may transmit the indication of the restricted set by transmitting a respective restricted set for the respective layer. For example, for the layer 302, the BS 205 may indicate the SD beamforming components 310 and 312 by transmitting a first restricted set $S'340$ (which corresponds to a union of $S'320$ and $S'322$ in FIG. 3A) to the UE 215. Additionally, for the layer 304, the BS 205 may indicate the SD beamforming components 314 and 316 by transmitting a second restricted set $S'342$ (which corresponds to a union of $S'324$ and $S'326$ in FIG. 3A) to the UE 215. Additionally, for the layer 306, the BS 205 may indicate the SD beamforming components 318 and 319 by transmitting a third restricted set $S'346$ (which corresponds to a union of $S'328$ and $S'330$ in FIG. 3A) to the UE 215.

In FIG. 3C, the BS 205 uses a communication scheme 303 to transmit an indication of a respective restricted set of FD beamforming components for all SD beamforming components of all T layers. In the scheme 303, the BS 205 may transmit the indication of the restricted set by transmitting a respective restricted set for all T layers. For example, for the layers 302, 304, and 306 the BS 205 may indicate the SD beamforming components 310, 312, 314, 216, 318, and 319 by transmitting a restricted set $S'350$ (which corresponds to a union of $S'340$, $S'342$, and $S'346$ in FIG. 3B) to the UE 215. The respective restricted set for all T layers may be the restricted set of FD beamforming components 210.

CSI Feedback Based on FD Compression

Figure 4:
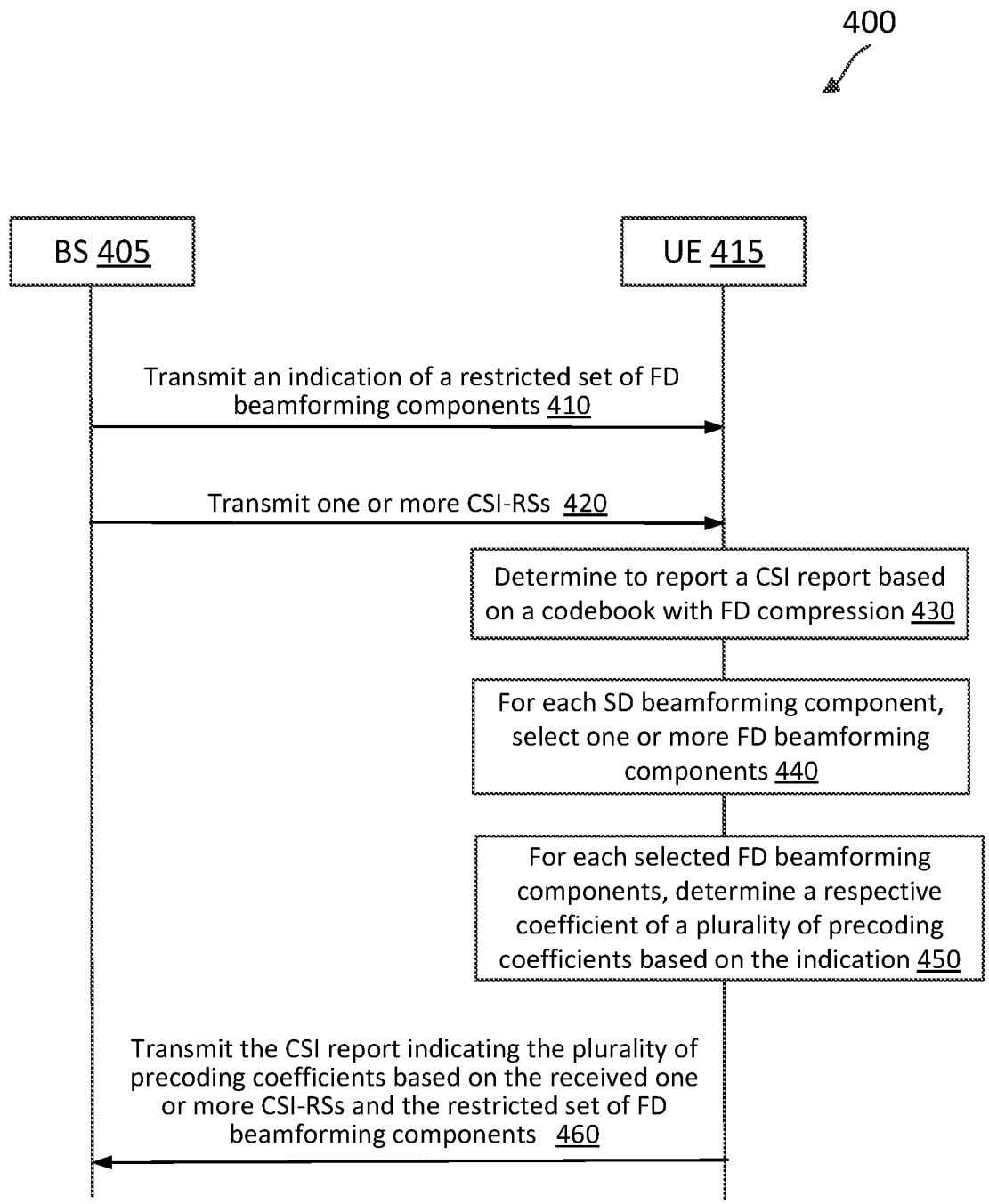
FIG. 4 is a signaling diagram illustrating a method of CSI reporting associated with FD compressed feedback according to one or more aspects of the present disclosure.

The UE 215 may be configured to report FD compressed feedback (e.g., plurality of precoding coefficients) to reduce overhead of the CSI report 220. FIG. 4 is a signaling diagram illustrating a method 400 of CSI reporting associated with FD compressed feedback according to one or more aspects of the present disclosure. The method 400 may be implemented between a UE 415 and a BS 405 (e.g., located in the network 100). The UE 415 may correspond to UEs 115, 215 515, 615 and/or 700, and the BS 405 may correspond to BSs 105, 205, 505, 605, and/or 800). The method 400 may employ similar CSI reporting mechanisms as described with respect to FIGS. FIGS. 1, 2, 3A-3C, 5, 6, 7, 8, 9, 10, 11, and/or 12 and may reuse the same parameter representations as described in the present disclosure. As illustrated, the method 400 includes a number of enumerated actions, but embodiments of the method 400 may include additional actions before, after, and in between the enumerated actions. In some embodiments, one or more of the enumerated actions may be omitted or performed in a different order.

At action 410, the BS 405 transmits an indication of a restricted set of FD beamforming components. For example, the BS 405 may transmit the indication via an RRC signaling message, a MAC CE, and/or in DCI. At action 420, the BS 405 may transmit one or more CSI-RSs. The UE 415 may receive the indication of the restricted set of FD beamforming components and the one or more CSI-RSs.

At action 430, the UE 415 determines to report a CSI report based on a codebook with FD compressions. In an example, the BS 205 may transmit a CSI report configuration message indicating to the UE 415 to transmit the CSI report based on CSI FD compressed feedback (e.g., based on Type II codebook with FD compression, with or without port selection). In another example, a wireless standard specifies that the UE 415 transmit the CSI report based on CSI FD compressed feedback (e.g., regulates the UE 215 to report CSI based on Type II codebook with FD compression, with or without port selection).

In some examples, the UE 415 performs actions 440 and 450 in response to a determination to report the CSI report based on a codebook with FD compression (without or without port selection). At action 440, for each SD beamforming component, the UE 415 selects one or more FD beamforming components. In an example, the UE 415 may select one or more FD beamforming components based on the corresponding indication of the restricted set for an SD beamforming component. The UE 415 may determine the coefficient matrix $W_2$ and the FD beamforming component matrix $W_f$, in which the indexes of the used FD beamforming components in $W_f$ are contained in $S'$, where $S'$ represents the set of restricted FD basis indexes, and the indexes in $S'$ are not necessarily consecutive (e.g., $S' \subseteq S$). A codebook may include a set of FD basis, each identified by an index. The BS 205 may restrict the UE 215 to a subset of the FD basis in the codebook. The BS 205 may indicate the restricted subset by indicating the indexes (in various forms) from which the UE 115 may select. Accordingly, the UE 415 may report the plurality of precoding coefficients in $\tilde{W}_2$ or selects and reports a preconfigured number of CSI-RS ports whose coefficients have the highest amplitudes.

At action 450, for each selected FD beamforming components, the UE 415 determines a respective coefficient of a plurality of precoding coefficients based on the indication.

At action 460, the UE 415 transmits the CSI report indicating the plurality of precoding coefficients based on the received one or more CSI-RSs and the restricted set of FD beamforming components. In some instances, the CSI report is associated with a Type II CSI codebook associated with a BS and/or a Type II Codebook with frequency compression (with or without port selection) associated with a BS.

Using some of the techniques provided by the method 400, the UE 415 may determine optimal FD beamforming components and their coefficients, which may improve CSI accuracy and thus increase DL throughput, with less calculation complexity.

CSI Feedback Based on Port Selection with Spatial-Frequency Beam Forming

Figure 5:
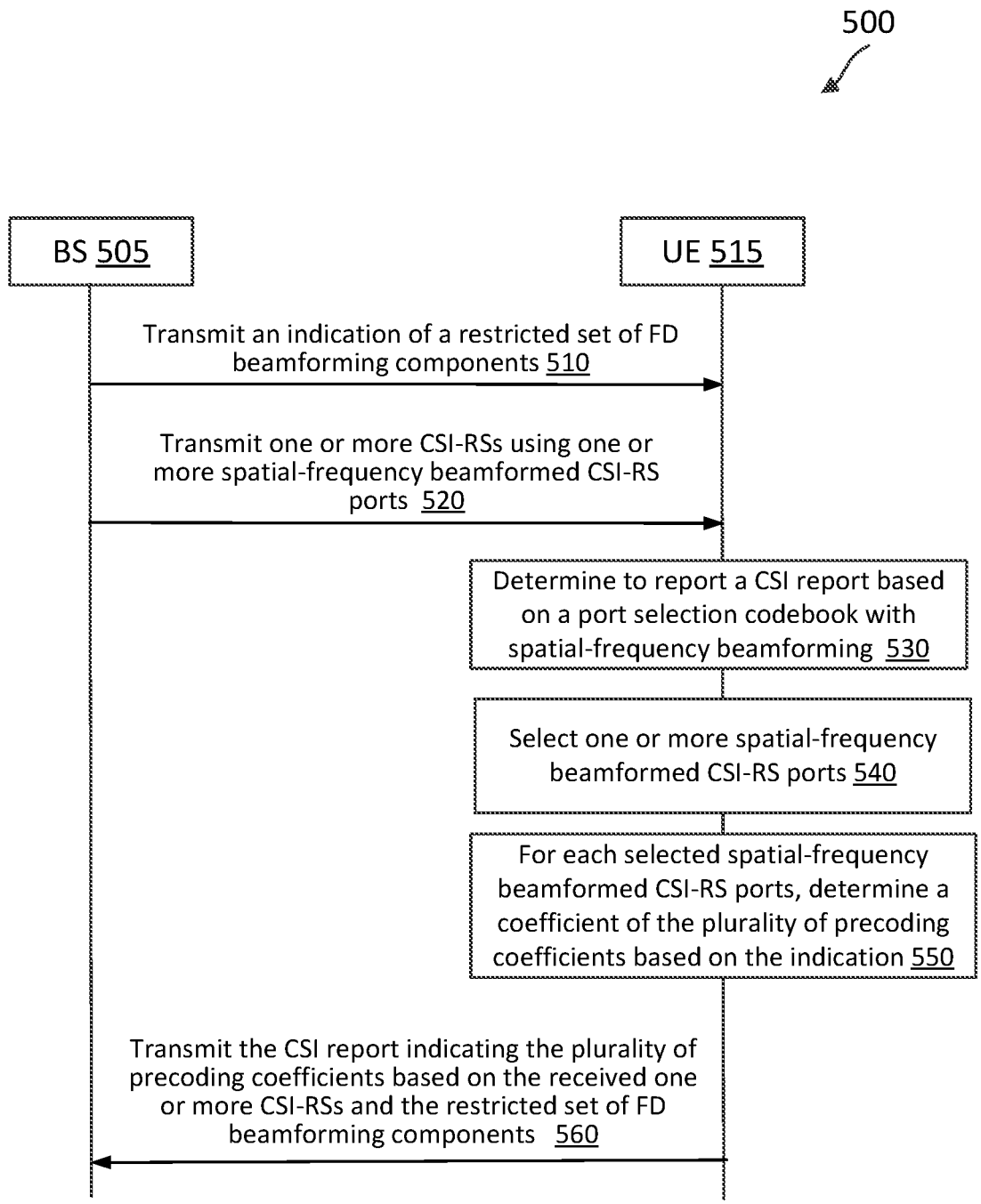
FIG. 5 is a signaling diagram illustrating a method of CSI reporting associated with a port selection codebook with spatial-frequency beamforming according to one or more aspects of the present disclosure.

The UE 215 may be configured to report feedback (e.g., plurality of precoding coefficients) based on a port selection codebook with spatial-frequency beamforming. FIG. 5 is a signaling diagram illustrating a method 500 of CSI reporting associated with a port selection codebook with spatial-frequency beamforming according to one or more aspects of the present disclosure. The method 500 may be implemented between a UE 515 and a BS 505 (e.g., located in the network 100). The UE 515 may correspond to UEs 115, 215 415, 615 and/or 700, and the BS 505 may correspond to BSs 105, 205, 405, 605, and/or 800). The method 500 may employ similar CSI reporting mechanisms as described with respect to FIGS. FIGS. 1, 2, 3A-3C, 4, 6, 7, 8, 9, 10, 11, and/or 12 and may reuse the same parameter representations as described in the present disclosure. As illustrated, the method 500 includes a number of enumerated actions, but embodiments of the method 500 may include additional actions before, after, and in between the enumerated actions. In some embodiments, one or more of the enumerated actions may be omitted or performed in a different order.

At action 510, the BS 505 transmits an indication of a restricted set of FD beamforming components. For example, the BS 505 may transmit the indication via an RRC signaling message, a MAC CE, and/or in DCI. At action 520, the BS 505 may transmit one or more CSI-RSs. The BS 505 may transmit the one or more CSI-RSs using one or more spatial-frequency beamformed CSI-RS ports. The UE 515 may receive the indication of the restricted set of FD beamforming components and the one or more CSI-RSs. The UE 515 may receive the one or more CSI-RSs based on one or more spatial-frequency beamformed CSI-RS ports at the BS 505.

At action 530, the UE 515 determines to report a CSI report based on a port selection codebook with spatial-frequency beamforming. In an example, the BS 205 may transmit a CSI report configuration message indicating to the UE 515 to transmit the CSI report based on a port selection codebook with spatial-frequency beamforming (e.g., based on Type II port selection codebook with spatial-frequency beamforming). In another example, a wireless standard specifies that the UE 515 transmit the CSI report based a port selection codebook with spatial-frequency beamforming (e.g., regulates the UE 215 to report CSI based on Type II port selection codebook with spatial-frequency beamforming).

In some examples, the UE 515 performs actions 540 and 550 in response to a determination to report the CSI report based on a port selection codebook with spatial-frequency beamforming. At action 540, for each selected spatial-frequency beamformed CSI-RS ports, the UE 515 may determine a coefficient of the plurality of precoding coefficients based on the indication. The UE 515 may determine a respective coefficient for each spatial-frequency beamformed port, where the FD beamforming components are indicated in the corresponding FD beamforming component restriction subset $S'$. In an example, the UE 515 may determine a non-FD-beamformed channel response matrix based on the received one or more CSI-RS and the indication of the restricted set of FD beamforming components. The UE 515 may determine the coefficient based on the non-FD-beamformed channel response matrix and may select one or more spatial-frequency beamformed CSI-RS ports by selecting the one or more spatial-frequency beamformed CSI-RS ports having a highest amplitude of the coefficient. In another example, the UE 515 may determine a channel estimation result for the one or more spatial-frequency beamformed CSI-RS ports based on the received one or more CSI-RS and the indication of the restricted set of FD beamforming components. The UE 515 may determine the coefficient based on the channel estimation result and may select one or more spatial-frequency beamformed CSI-RS ports by selecting the one or more spatial-frequency beamformed CSI-RS ports having a highest amplitude of the coefficient.

At action 560, the UE 515 transmits the CSI report indicating the selected one or more spatial-frequency beamformed CSI-RS ports and corresponding coefficients (e.g., a plurality of precoding coefficients) based on the received one or more CSI-RSs and the restricted set of FD beamforming components. In some instances, the CSI report is associated with a Type II CSI codebook associated with a BS and/or a Type II port selection codebook with spatial-frequency beamforming.

Using some of the techniques provided by the method 500, the UE 515 may improve channel estimation performance and derive an optimal port selection result and port combination coefficients, which may improve CSI accuracy and thus increase DL throughout.

Indication of One or More Groups of CSI-RS Ports with Spatial-Frequency Beamforming In some aspects, the BS 505 may transmit an indication of one or more groups of CSI-RS ports with spatial-frequency beamforming. For example, the BS 505 may transmit an indication of a group of CSI-RS ports corresponding to a common SD beamforming component and different FD beamforming components or a group of CSI-RS ports corresponding to a common FD beamforming component and different FD beamforming components. Additionally, by indicating the group information of the CSI-RS ports with spatial-frequency beamforming, the CSI reporting accuracy may be improved compared with deriving DL channel status solely by UL sounding, when the DL-UL reciprocity is partial (e.g., in FDD systems or TDD systems where the UL and the DL are not transmitted in the same subbands).

Figure 6:
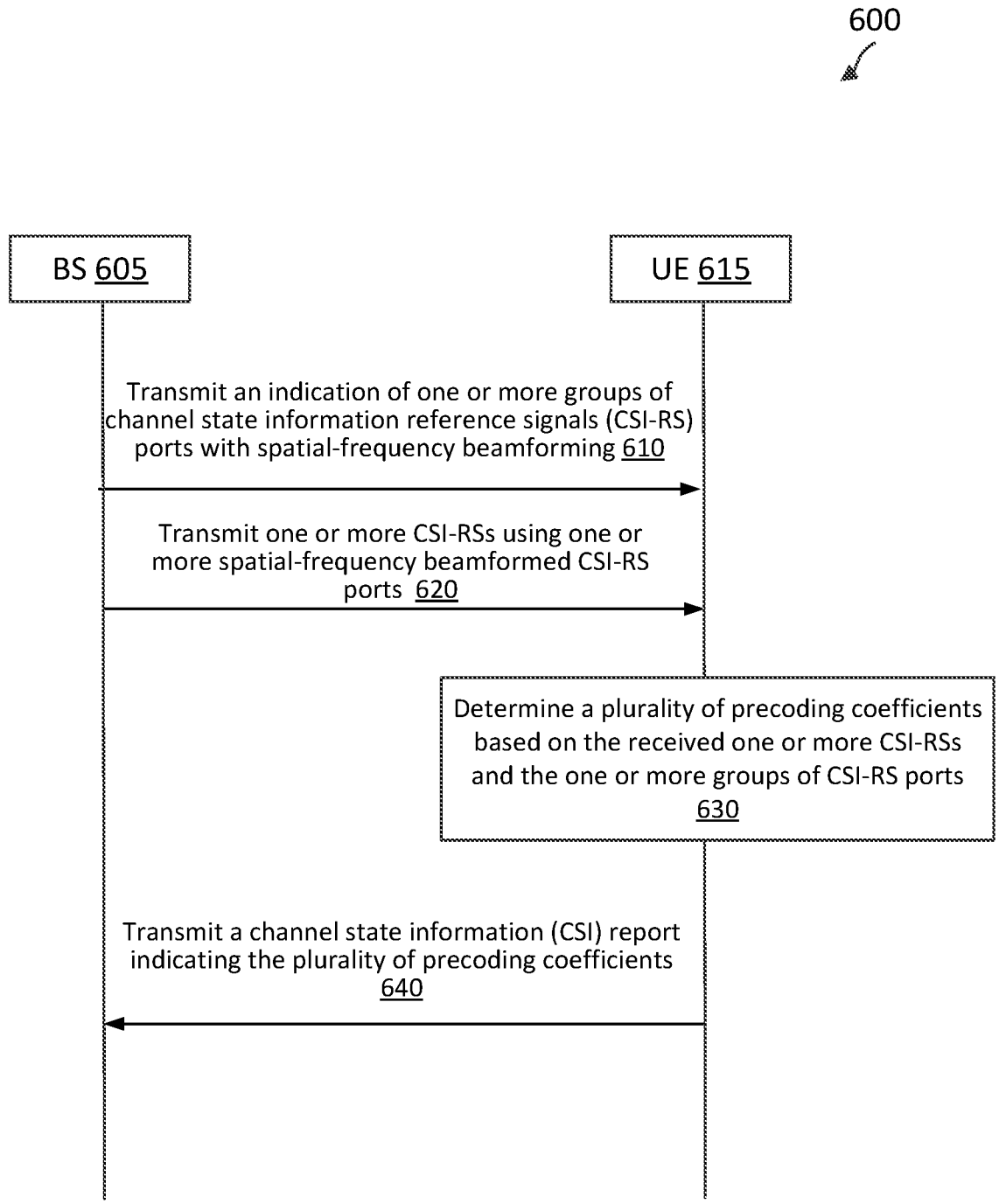
FIG. 6 is a signaling diagram illustrating a method of CSI reporting associated with channel state information-reference signal (CSI-RS) ports with spatial-frequency beamforming according to one or more aspects of the present disclosure.

FIG. 6 is a signaling diagram illustrating a method 600 of CSI reporting associated with CSI-RS ports with spatial-frequency beamforming according to one or more aspects of the present disclosure. The method 600 may be implemented between a UE 615 and a BS 605 (e.g., located in the network 100). The UE 615 may correspond to 115, 215, 415, 515, and/or 700, and the BS 605 may correspond to BSs 105, 205, 405, 505, and/or 800). The method 600 may employ similar CSI reporting mechanisms as described with respect to FIGS. 1, 2, 3A-3C, 4, 5, 7, 8, 9, 10, 11, and/or 12 and may reuse the same parameter representations as described in the present disclosure. As illustrated, the method 600 includes a number of enumerated actions, but embodiments of the method 600 may include additional actions before, after, and in between the enumerated actions. In some embodiments, one or more of the enumerated actions may be omitted or performed in a different order.

At action 610, the BS 605 may transmit an indication of one or more groups of CSI-RS ports with spatial-frequency beamforming. In an example, all the CSI-RS ports in each group correspond to a common SD beamforming component and different FD beamforming components. In another example, all the CSI-RS ports in each group correspond to a common FD beamforming component and different SD beamforming components. The UE 615 may receive the indication of one or more groups of CSI-RS ports with spatial-frequency beamforming from the BS 605. In some examples, the UE 615 may receive a CSI report configuration message including the indication of one or more groups of CSI-RS ports with spatial-frequency beamforming.

At action 620, the BS 605 may transmit one or more CSI-RSs using one or more spatial-frequency beamformed CSI-RS ports. The UE 615 may receive the one or more CSI-RSs from the BS 605. For example, the UE 615 may receive the indication of one or more groups of CSI-RS ports via an RRC signaling message, a MAC CE, and/or in DCI.

At action 630, the UE 615 may determine a plurality of precoding coefficients based on the received one or more CSI-RSs and the one or more groups of CSI-RS ports.

At action 640, the UE 615 may transmit a CSI report indicating the plurality of precoding coefficients.

Figure 7:
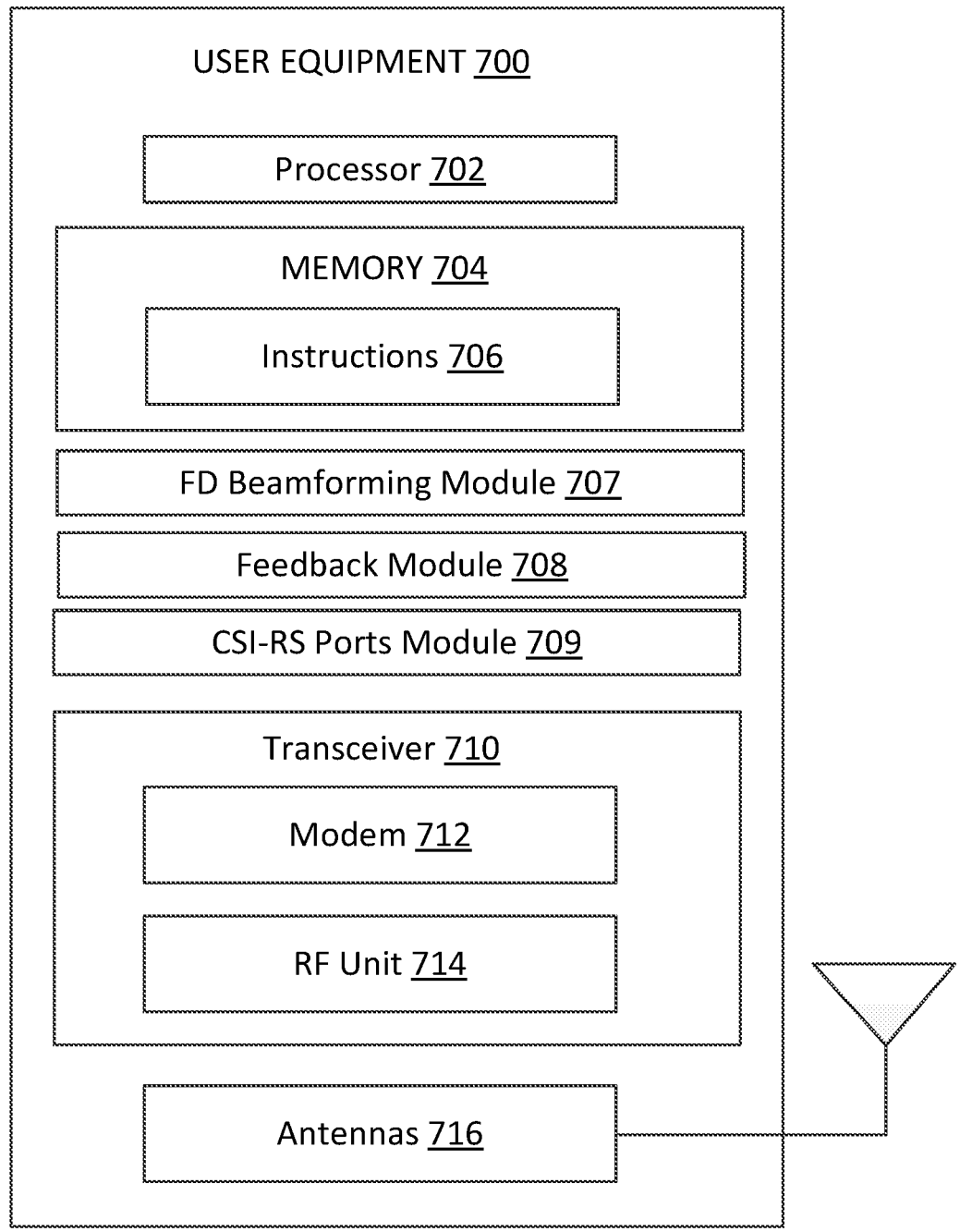
FIG. 7 is a block diagram of a user equipment (UE) according to one or more aspects of the present disclosure.

FIG. 7 is a block diagram of an exemplary UE 700 according to one or more aspects of the present disclosure. The UE 700 may be a UE 115, UE 215, UE 415, UE 515, and/or UE 615 as discussed above in FIGS. 1, 2, 4, 5, and/or 6, respectively. As shown, the UE 700 may include a processor 702, a memory 704, an FD beamforming module 707, a feedback module 708, a CSI-RS ports module 709, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 (e.g., 115, 215, 415, 515, and/or 615) in connection with aspects of the present disclosure, for example, aspects of FIGS. 1, 2, 3A-3C, 4, 5, 6, 9, and/or 10. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

In the example illustrated in FIG. 7, the UE 700 includes the FD beamforming module 707, the feedback module 708, and the CSI-RS ports modules 709. This is not intended to be limiting, and it should be understood that in other examples, the UE 700 may have additional and/or different components. In another example, the UE 700 may include the CSI-RS ports modules 709 and the feedback module 708, but not the FD beamforming module 707.

The FD beamforming module 707, the feedback module 708, and/or the CSI-RS ports modules 709 may be implemented via hardware, software, or combinations thereof. For example, the FD beamforming module 707, the feedback module 708, and/or the CSI-RS ports modules 709 may be implemented as a processor, circuit, and/or instructions 706 stored in the memory 704 and executed by the processor 702. In some instances, the FD beamforming module 707, the feedback module 708, and/or the CSI-RS ports modules 709 can be integrated within the modem subsystem 712. For example, the FD beamforming module 707, the feedback module 708, and/or the CSI-RS ports modules 709 can be implemented by a combination of software components (e.g., executed by a DSP or a general processor) and hardware components (e.g., logic gates and circuitry) within the modem subsystem 712.

The FD beamforming module 707, the feedback module 708, and/or the CSI-RS ports modules 709 may be used for various aspects of the present disclosure, for example, aspects of FIGS. 1, 2, 3A-3C, 4, 5, 6, 9, and/or 10. In some aspects, the FD beamforming module 707 may be configured to receive an indication of a restricted set of FD beamforming components, for example, from a BS. The CSI-RS ports modules 709 may be configured to receive one or more CSI-RSs from the BS. The feedback module 708 may be configured to transmit a CSI report indicating a plurality of precoding coefficients based on the received one or more CSI-RSs and the restricted set of FD beamforming components.

In some aspects, the CSI-RS ports modules 709 may be configured to receive an indication of one or more groups of CSI-RS ports with spatial-frequency beamforming from a BS. The CSI-RS ports modules 709 may be configured to receive one or more CSI-RSs from the BS. The feedback module 708 may be configured to transmit a CSI report indicating a plurality of precoding coefficients based on the received one or more CSI-RSs and the one or more groups of CSI-RS ports.

As shown, the transceiver 710 may include the modem subsystem 712 and the RF unit 714. The transceiver 710 can be configured to communicate bi-directionally with other devices, such as the BSs 105, 205, 405, 505, 605, 800 and/or another core network element. The modem subsystem 712 may be configured to modulate and/or encode the data from the memory 704, the FD beamforming module 707, the feedback module 708, and/or the CSI-RS ports modules 709 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 714 may be configured to process (e.g., perform analog to digital conversion or digital to analog conversion, etc.) modulated/encoded data (e.g., CSI-RS report, CSI feedback, CSI-RSs, the plurality of precoding coefficients, an indication of a restricted set of FD beamforming components, and an indication of one or more groups of CSI-RS ports with spatial-frequency beamforming, etc.) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., CSI-RS report, CSI feedback, CSI-RSs, the plurality of precoding coefficients, an indication of a restricted set of FD beamforming components, and an indication of one or more groups of CSI-RS ports with spatial-frequency beamforming, etc.) to the FD beamforming module 707, the feedback module 708, and/or the CSI-RS ports modules 709 for processing. The antennas 716 may include multiple antennas of similar or different designs in order to sustain multiple transmission links. The RF unit 714 may configure the antennas 716.

In an aspect, the transceiver 710 may coordinate with the FD beamforming module 707 to receive, from a BS, an indication of a restricted set of FD beamforming components. The transceiver 710 may coordinate with the CSI-RS ports module 709 to receive, from the BS, one or more CSI-RSs. The transceiver 710 may also coordinate with the feedback module 708 to transmit, to the BS, a CSI report indicating a plurality of precoding coefficients based on the received one or more CSI-RSs and the restricted set of FD beamforming components.

In an aspect, the transceiver 710 may coordinate with the CSI-RS ports 709 to receive, from a BS, an indication of one or more groups of CSI-RS ports with spatial-frequency beamforming. The transceiver 710 may coordinate with the CSI-RS ports module 709 to receive, from the BS, one or more CSI-RSs. The transceiver 710 may also coordinate with the feedback module 708 to transmit, to the BS, a CSI report indicating a plurality of precoding coefficients based on the received one or more CSI-RSs and the one or more groups of CSI-RS ports.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
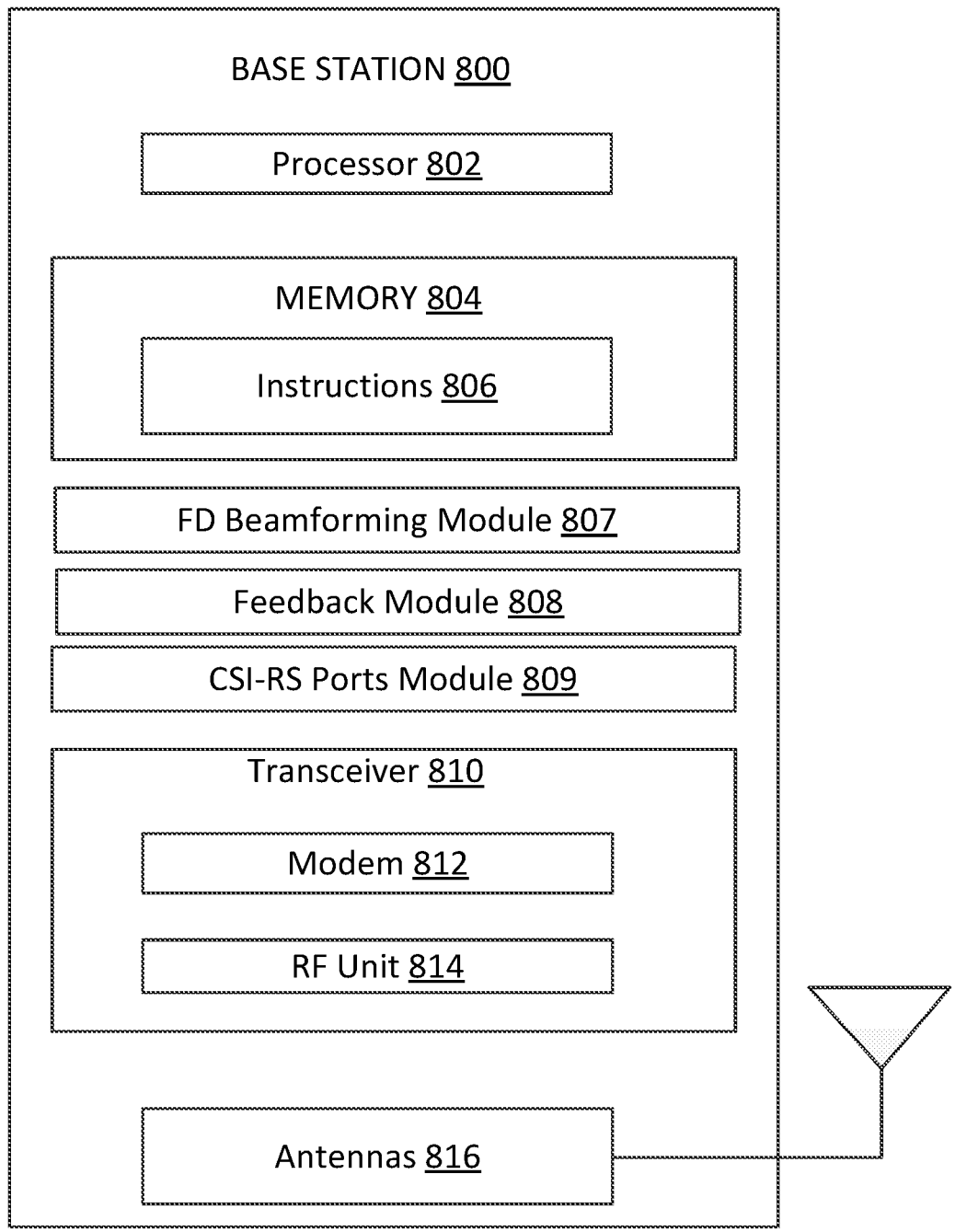
FIG. 8 is a block diagram of a base station (BS) according to one or more aspects of the present disclosure.

FIG. 8 is a block diagram of an exemplary BS 800 according to one or more aspects of the present disclosure. The BS 800 may be a BS 105, BS 205, BS 405, BS 505, and/or BS 605 as discussed above in FIGS. 1, 2, 4, 5, and/or 6, respectively. As shown, the BS 800 may include a processor 802, a memory 804, an FD beamforming module 807, a feedback module 808, a CSI-RS ports module 809, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1, 2, 3A-3C, 4, 5, 6, 11, and/or 12. Instructions 806 may also be referred to as code, which may be interpreted broadly to include any type of computer-readable statement(s) as discussed above with respect to FIG. 7.

In the example illustrated in FIG. 8, the BS 800 includes the FD beamforming module 807, the feedback module 808, and the CSI-RS ports modules 809. This is not intended to be limiting, and it should be understood that in other examples, the BS 800 may have additional and/or different components. In another example, the BS 800 may include the CSI-RS ports modules 809 and the feedback module 808, but not the FD beamforming module 807.

The FD beamforming module 807, the feedback module 808, and/or the CSI-RS ports modules 809 may be implemented via hardware, software, or combinations thereof. For example, the FD beamforming module 807, the feedback module 808, and/or the CSI-RS ports modules 809 may be implemented as a processor, circuit, and/or instructions 806 stored in the memory 804 and executed by the processor 802. In some instances, the FD beamforming module 807, the feedback module 808, and/or the CSI-RS ports modules 809 can be integrated within the modem subsystem 812. For example, the FD beamforming module 807, the feedback module 808, and/or the CSI-RS ports modules 809 can be implemented by a combination of software components (e.g., executed by a DSP or a general processor) and hardware components (e.g., logic gates and circuitry) within the modem subsystem 812.

The FD beamforming module 807, the feedback module 808, and/or the CSI-RS ports modules 809 may be used for various aspects of the present disclosure, for example, aspects of FIGS. 1, 2, 3A-3C, 4, 5, 6, 11, and/or 12. In some aspects, the FD beamforming module 807 may be configured to transmit an indication of a restricted set of FD beamforming components, for example, to a UE. The CSI-RS ports modules 809 may be configured to transmit one or more CSI-RSs to a UE. The feedback module 808 may be configured to receive a CSI report indicating a plurality of precoding coefficients based on the transmitted one or more CSI-RSs and the restricted set of FD beamforming components.

In some aspects, the CSI-RS ports modules 809 may be configured to transmit an indication of one or more groups of CSI-RS ports with spatial-frequency beamforming to a UE. The CSI-RS ports modules 809 may be configured to transmit one or more CSI-RSs to a UE. The feedback module 808 may be configured to receive a CSI report indicating a plurality of precoding coefficients based on the received one or more CSI-RSs and the one or more groups of CSI-RS ports.

As shown, the transceiver 810 may include the modem subsystem 812 and the RF unit 814. The transceiver 810 can be configured to communicate bi-directionally with other devices, such as the UEs 115, 215, 415, 515, 605, 700 and/or another core network element. The modem subsystem 812 may be configured to modulate and/or encode data according to a MCS, e.g., a LDPC coding scheme, a turbo coding scheme, a convolutional coding scheme, a polar coding scheme, a digital beamforming scheme, etc. The RF unit 814 may be configured to process (e.g., perform analog to digital conversion or digital to analog conversion, etc.) modulated/encoded data (e.g., CSI-RS report, CSI feedback, CSI-RSs, the plurality of precoding coefficients, an indication of a restricted set of FD beamforming components, and an indication of one or more groups of CSI-RS ports with spatial-frequency beamforming, etc.) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 or 700 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., CSI-RS report, CSI feedback, CSI-RSs, the plurality of precoding coefficients, an indication of a restricted set of FD beamforming components, and an indication of one or more groups of CSI-RS ports with spatial-frequency beamforming, etc.) to the FD beamforming module 707, the feedback module 708, and/or the CSI-RS ports modules 709 for processing. The antennas 816 may include multiple antennas of similar or different designs in order to sustain multiple transmission links.

In an aspect, the transceiver 810 may coordinate with the FD beamforming module 807 to transmit, to the UE, an indication of a restricted set of FD beamforming components. The transceiver 810 may coordinate with the CSI-RS ports module 809 to transmit, to the UE, one or more CSI-RSs. The transceiver 810 may also coordinate with the feedback module 808 to receive, from the BS, a CSI report indicating a plurality of precoding coefficients based on the received one or more CSI-RSs and the restricted set of FD beamforming components.

In an aspect, the transceiver 810 may coordinate with the CSI-RS ports 809 to transmit, to the UE, an indication of one or more groups of CSI-RS ports with spatial-frequency beamforming. The transceiver 810 may coordinate with the CSI-RS ports module 809 to transmit, to the UE, one or more CSI-RSs. The transceiver 810 may also coordinate with the feedback module 808 to receive, from the BS, a CSI report indicating a plurality of precoding coefficients based on the received one or more CSI-RSs and the one or more groups of CSI-RS ports.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
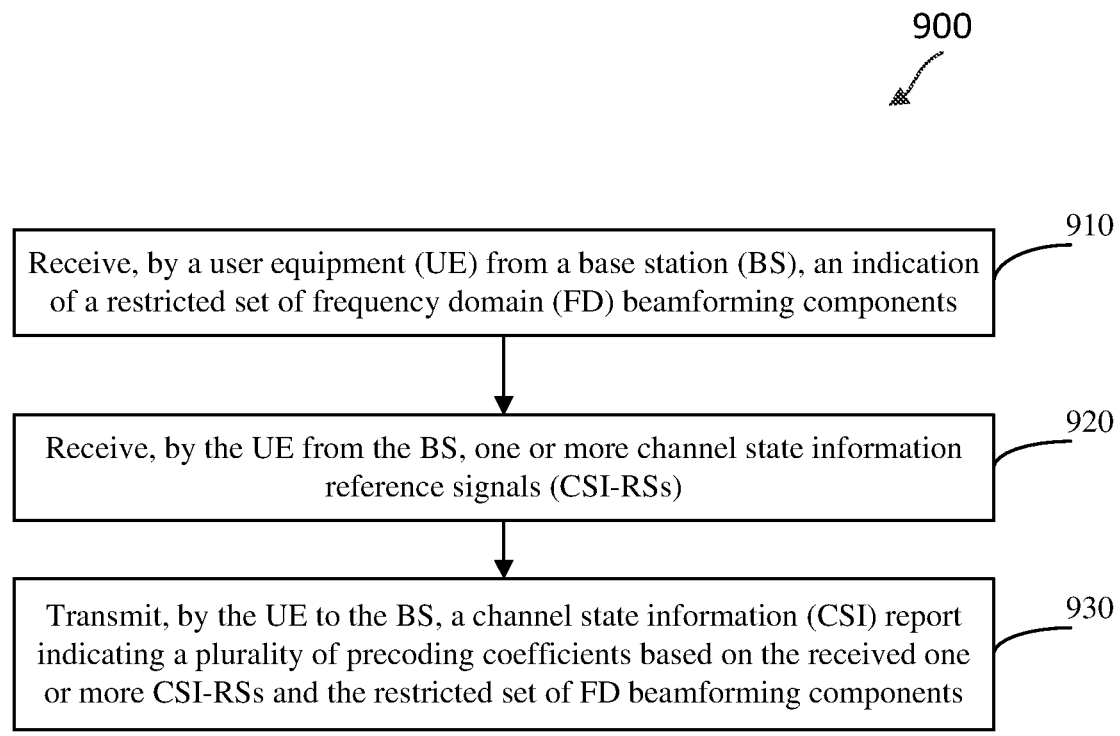
FIG. 9 is a flow diagram of a wireless communication method according to one or more aspects of the present disclosure.

FIG. 9 is a flow diagram of a wireless communication method 900 according to one or more aspects of the present disclosure. Aspects of the method 900 can be executed by a computing device (e.g., a processor, processing circuit, and/or other suitable component) of a wireless communication device or other suitable means for executing the blocks. For example, a wireless communication device, such as the UEs 115, 215, 415, 515, 615 and/or 700, may utilize one or more components, such as the processor 702, the memory 704, the FD beamforming module 707, the feedback module 708, the CSI-RS ports module 709, the transceiver 710, the modem 712, and the one or more antennas 716, to execute the blocks of method 900. The method 900 may employ similar mechanisms as discussed in relation to FIGS. 1, 2, 3A-3C, 4, 5, 6, and/or 7. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, a UE (e.g., the UEs 115, 215, 415, 515, 615 and/or 700) receives an indication of a restricted set of FD beamforming components. In some instances, the UE may utilize one or more components, such as the processor 702, the FD beamforming module 707, the transceiver 710, the modem 712, and the one or more antennas 716, to receive the indication of a restricted set of FD beamforming components from a BS.

At block 920, the UE (e.g., the UEs 115, 215, 415, 515, 615 and/or 700) receives one or more channel state information reference signals (CSI-RSs). In some instances, the UE may utilize one or more components, such as the processor 702, the CSI-RS ports module 707, the transceiver 710, the modem 712, and the one or more antennas 716, to receive one or more CSI-RSs from the BS.

At block 930, the UE (e.g., the UEs 115, 215, 415, 515, 615 and/or 700) transmits a CSI report indicating a plurality of precoding coefficients based on the received one or more CSI-RSs and the restricted set of FD beamforming components. In some instances, the UE may utilize one or more components, such as the processor 702, the feedback module 708, the transceiver 710, the modem 712, and the one or more antennas 716, to transmit the CSI report to the BS.

In some instances, the feedback module 708 is associated with a Type II CSI codebook associated with a BS 605 and/or a Type II Codebook with frequency compression (with or without port selection) associated with a BS.

Figure 10:
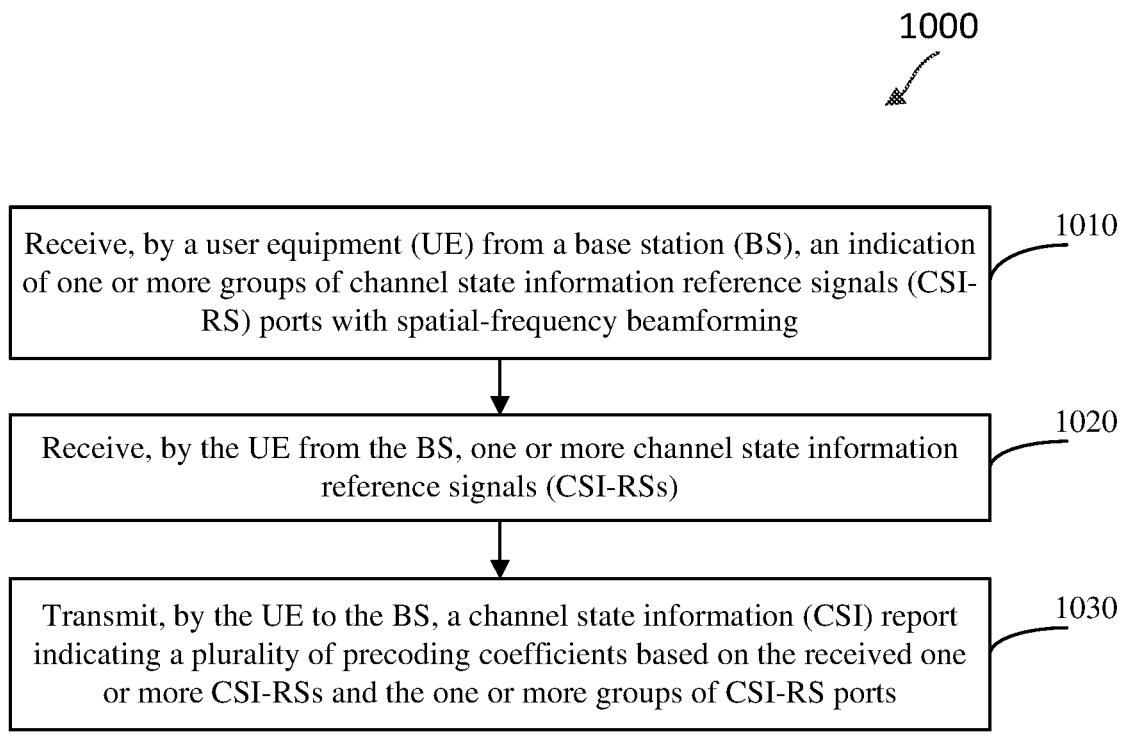
FIG. 10 is a flow diagram of a wireless communication method according to one or more aspects of the present disclosure.

FIG. 10 is a flow diagram of a wireless communication method 1000 according to one or more aspects of the present disclosure. Aspects of the method 1000 can be executed by a computing device (e.g., a processor, processing circuit, and/or other suitable component) of a wireless communication device or other suitable means for executing the blocks. For example, a wireless communication device, such as the UEs 115, 215, 415, 515, 615 and/or 700, may utilize one or more components, such as the processor 702, the memory 704, the FD beamforming module 707, the feedback module 708, the CSI-RS ports module 709, the transceiver 710, the modem 712, and the one or more antennas 716, to execute the blocks of method 1000. The method 1000 may employ similar mechanisms as discussed in relation to FIGS. 1, 2, 3A-3C, 4, 5, 6, and/or 7. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, a UE (e.g., the UEs 115, 215, 415, 515, 615 and/or 700) receives an indication of one or more groups of channel state information reference signals (CSI-RS) ports with spatial-frequency beamforming. In some instances, the UE may utilize one or more components, such as the processor 702, the CSI-RS ports module 709, the transceiver 710, the modem 712, and the one or more antennas 716, to receive the indication from the BS.

At block 1020, the UE (e.g., the UEs 115, 215, 415, 515, 615 and/or 700) receives one or more CSI-RSs. In some instances, the UE may utilize one or more components, such as the processor 702, the CSI-RS ports module 709, the transceiver 710, the modem 712, and the one or more antennas 716, to receive the one or more CSI-RSs from the BS.

At block 1030, the UE (e.g., the UEs 115, 215, 415, 515, 615 and/or 700) transmits a CSI report indicating a plurality of precoding coefficients based on the received one or more CSI-RSs and the one or more groups of CSI-RS ports. In some instances, the UE may utilize one or more components, such as the processor 702, the feedback module 708, the transceiver 710, the modem 712, and the one or more antennas 716, to transmit the CSI report to the BS.

In some instances, the feedback module 708 is associated with a Type II CSI codebook associated with a BS and/or a Type II port selection codebook with spatial-frequency beamforming associated with a BS.

Figure 11:
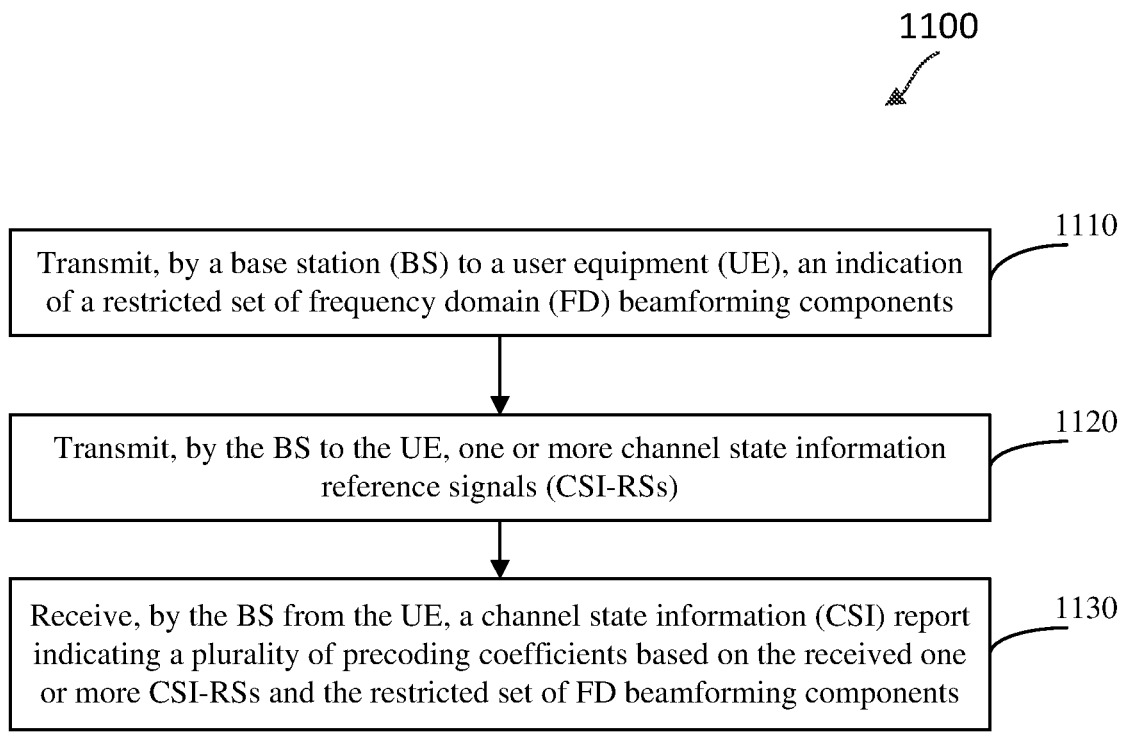
FIG. 11 is a flow diagram of a wireless communication method according to one or more aspects of the present disclosure.

FIG. 11 is a flow diagram of a wireless communication method 1100 according to one or more aspects of the present disclosure. Aspects of the method 1100 can be executed by a computing device (e.g., a processor, processing circuit, and/or other suitable component) of a wireless communication device or other suitable means for executing the blocks. For example, a wireless communication device, such as the BSs 105, 205, 405, 505, 605, and/or 800, may utilize one or more components, such as the processor 802, the memory 804, the FD beamforming module 807, the feedback module 808, the CSI-RS ports module 809, the transceiver 810, the modem 812, and the one or more antennas 816, to execute the blocks of method 1100. The method 1100 may employ similar mechanisms as discussed in relation to FIGS. 1, 2, 3A-3C, 4, 5, 6, and/or 8. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, a BS (e.g., the BSs 105, 205, 405, 505, 605, and/or 800) transmits an indication of a restricted set of frequency domain (FD) beamforming components. In some instances, the BS may utilize one or more components, such as the processor 802, the FD beamforming module 807, the transceiver 810, the modem 812, and the one or more antennas 816, to transmit the indication of the restricted set of FD beamforming components to the UE.

At block 1120, the BS (e.g., the BSs 105, 205, 405, 505, 605, and/or 800) transmits one or more CSI-RSs. In some instances, the BS may utilize one or more components, such as the processor 802, the CSI-RS ports module 809, the transceiver 810, the modem 812, and the one or more antennas 816, to transmit the one or more CSI-RSs to the UE.

At block 1130, the BS (e.g., the BSs 105, 205, 405, 505, 605, and/or 800) receives a CSI report indicating a plurality of precoding coefficients based on the transmitted one or more CSI-RSs and the restricted set of FD beamforming components. In some instances, the BS may utilize one or more components, such as the processor 802, the feedback module 808, the transceiver 810, the modem 812, and the one or more antennas 816, to receive the CSI report from the UE.

In some instances, the feedback module 808 is associated with a Type II CSI codebook associated with a BS and/or a Type II Codebook with frequency compression (with or without port selection) associated with a BS.

Figure 12:
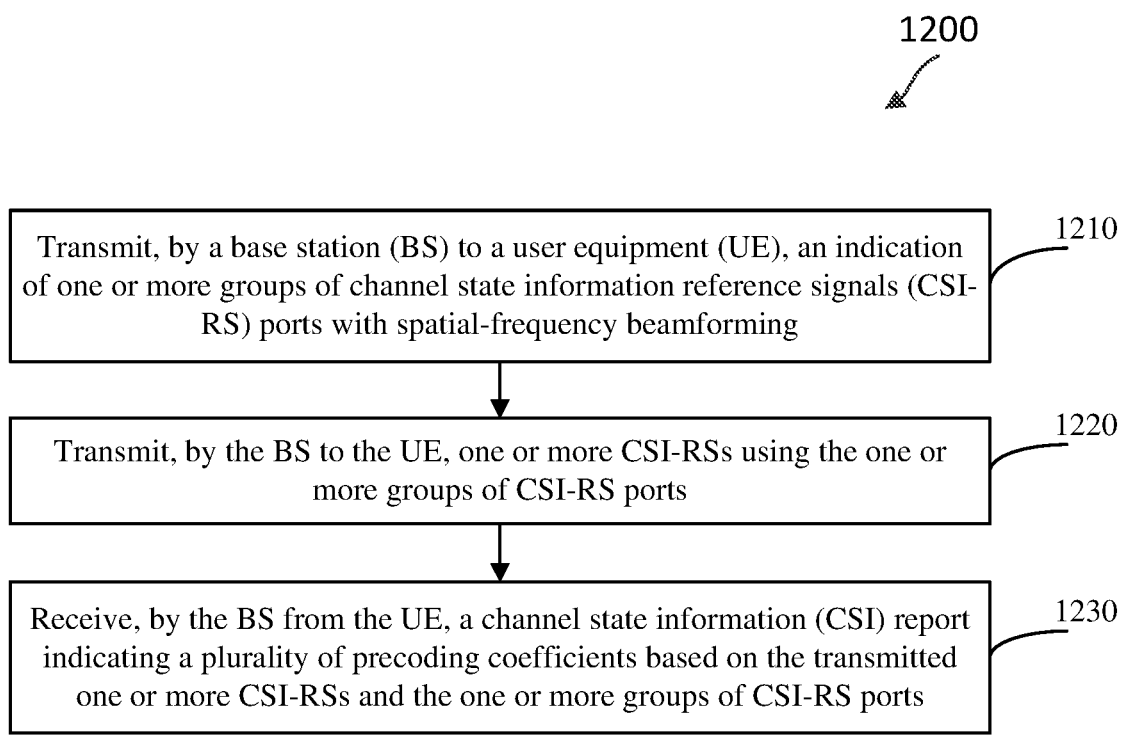
FIG. 12 is a flow diagram of a wireless communication method according to one or more aspects of the present disclosure.

FIG. 12 is a flow diagram of a wireless communication method 1200 according to one or more aspects of the present disclosure. Aspects of the method 1200 can be executed by a computing device (e.g., a processor, processing circuit, and/or other suitable component) of a wireless communication device or other suitable means for executing the blocks. For example, a wireless communication device, such as the BSs 105, 205, 405, 505, 605, and/or 800, may utilize one or more components, such as the processor 802, the memory 804, the FD beamforming module 807, the feedback module 808, the CSI-RS ports module 809, the transceiver 810, the modem 812, and the one or more antennas 816, to execute the blocks of method 1200. The method 1200 may employ similar mechanisms as discussed in relation to FIGS. 1, 2, 3A-3C, 4, 5, 6, and/or 8. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, a BS (e.g., the BSs 105, 205, 405, 505, 605, and/or 800) transmits an indication of one or more groups of CSI-RS ports with spatial-frequency beamforming. In some instances, the BS may utilize one or more components, such as the processor 802, the CSI-RS ports module 809, the transceiver 810, the modem 812, and the one or more antennas 816, to transmit the indication of one or more groups of CSI-RS ports with spatial-frequency beamforming to the UE.

At block 1220, a BS (e.g., the BSs 105, 205, 405, 505, 605, and/or 800) transmits one or more CSI-RSs using the one or more groups of CSI-RS ports. In some instances, the BS may utilize one or more components, such as the processor 802, the CSI-RS ports module 809, the transceiver 810, the modem 812, and the one or more antennas 816, to transmit the one or more CSI-RSs using the one or more groups of CSI-RS ports to the UE.

At block 1230, a BS (e.g., the BSs 105, 205, 405, 505, 605, and/or 800) receives a CSI report indicating a plurality of precoding coefficients based on the transmitted one or more CSI-RSs and the one or more groups of CSI-RS ports. In some instances, the BS may utilize one or more components, such as the processor 802, the feedback module 808, the transceiver 810, the modem 812, and the one or more antennas 816, to receive the CSI report from the UE.

In some instances, the feedback module 808 is associated with a Type II CSI codebook associated with a BS and/or a Type II port selection codebook with spatial-frequency beamforming associated with a BS.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), an indication of a respective restricted set of frequency domain (FD) beamforming components for all spatial domain (SD) beamforming components of each layer of a first number of layers;
   receiving, from the BS, one or more channel state information reference signals (CSI-RSs) based on one or more CSI-RS ports belonging to the first number of layers;
   determining, by the UE, a non-FD-beamformed channel response matrix based on the received one or more CSI-RS and the indication;
   selecting, by the UE, a plurality of precoding coefficients based on the received one or more CSI-RSs, the restricted set of FD beamforming components, and the non-FD-beamformed channel response matrix;
   selecting, by the UE, one or more spatial-frequency beamformed CSI-RS ports based on the indication; and
   transmitting, to the BS, a channel state information (CSI) report indicating precoding coefficients of the plurality of precoding coefficients associated with the selected spatial-frequency beamformed CSI-RS ports.

2. The method of claim 1, further comprising:
   selecting one or more FD beamforming components based on the indication; and
   for each selected FD beamforming component, determining a coefficient of the plurality of precoding coefficients.

3. The method of claim 2, further comprising:
   receiving, from the BS, a CSI report configuration message indicating the CSI report is based on a Type II Codebook with frequency compression.

4. The method of claim 2, wherein the selecting the one or more FD beamforming components includes selecting the one or more FD beamforming components based on a corresponding indication of the restricted set for an SD beamforming component.

5. The method of claim 1,
   wherein the receiving the one or more CSI-RSs includes receiving the one or more CSI-RSs based on the one or more spatial-frequency beamformed CSI-RS ports at the BS, further comprising:
   for each selected spatial-frequency beamformed CSI-RS ports, determining a coefficient of the plurality of precoding coefficients.

6. The method of claim 5, further comprising:
receiving, from the BS, a CSI report configuration message indicating the CSI report is based on a port selection codebook with spatial frequency beamforming.

7. The method of claim 1, wherein the receiving the indication of the restricted set of FD beamforming components includes receiving the indication via a radio resource control (RRC) signaling message.

8. The method of claim 1, further comprising:
receiving, from the BS, a channel state information (CSI) report configuration message including the indication.

9. The method of claim 1, wherein the receiving the indication of the restricted set of FD beamforming components includes receiving an indication of one or more discrete indexes of FD beamforming components, wherein the one or more discrete indexes corresponds to the restricted set of FD beamforming components.

10. The method of claim 9, wherein the one or more discrete indexes includes consecutive indexes of the FD beamforming components.

11. The method of claim 1, wherein the receiving the indication of the restricted set of FD beamforming components includes receiving an indication of an index window including a start index and an end index, the index window spanning a number of consecutive indexes of the FD beamforming components, and the index window corresponding to the restricted set of FD beamforming components.

12. The method of claim 1, wherein the receiving the indication of the restricted set of FD beamforming components includes receiving an indication of an index window including a start index and a length value, the index window spanning a number of nonconsecutive indexes of the FD beamforming components, and the index window corresponding to the restricted set of FD beamforming components.

13. The method of claim 1, wherein an FD beamforming component of the restricted set of FD beamforming components includes a discrete Fourier transform (DFT) vector.

14. The method of claim 1, wherein the receiving the indication of the restricted set of FD beamforming components includes receiving a set of indexes of the restricted set for a number of CSI-RS ports, wherein each CSI-RS port corresponds to an FD beamforming component with a respective index of the set of indexes.

15. A user equipment (UE), comprising:
a memory;
a transceiver; and
at least one processor coupled to the memory and the transceiver, wherein the UE is configured to:
receive, from a base station (BS), an indication of a respective restricted set of frequency domain (FD) beamforming components for all spatial domain (SD) beamforming components of each layer of a first number of layers;
receive, from the BS, one or more channel state information reference signals (CSI-RSs) based on one or more CSI-RS ports belonging to the first number of layers;
determine a non-FD-beamformed channel response matrix based on the received one or more CSI-RS and the indication;
select a plurality of precoding coefficients based on the received one or more CSI-RSs, the restricted set of FD beamforming components, and the non-FD-beamformed channel response matrix;

select one or more spatial-frequency beamformed CSI-RS ports based on the indication; and
transmit, to the BS, a channel state information (CSI) report indicating precoding coefficients of the plurality of precoding coefficients associated with the selected spatial-frequency beamformed CSI-RS ports.

16. The UE of claim 15, wherein the UE is further configured to:
select one or more FD beamforming components based on the indication; and
for each selected FD beamforming component, determine a coefficient of the plurality of precoding coefficients.

17. The UE of claim 15, wherein the UE is further configured to:
for each selected spatial-frequency beamformed CSI-RS ports, determine a coefficient of the plurality of precoding coefficients; and
receive the one or more CSI-RSs based on one or more spatial-frequency beamformed CSI-RS ports at the BS.

18. The UE of claim 17, wherein the UE is further configured to:
receive, from the BS, a CSI report configuration message indicating the CSI report is based on a port selection codebook with spatial frequency beamforming.

19. The UE of claim 17, wherein the UE is further configured to:
select the one or more spatial-frequency beamformed CSI-RS ports based on an amplitude of the coefficient.

20. The UE of claim 17, wherein the UE is further configured to:
determine a channel estimation result for the one or more spatial-frequency beamformed CSI-RS ports based on the received one or more CSI-RS and the indication;
determine the coefficient based on the channel estimation result; and
select the one or more spatial-frequency beamformed CSI-RS ports based on an amplitude of the coefficient.

21. The UE of claim 15, wherein the UE is further configured to:
receive the indication via at least one of a radio resource control (RRC) signaling message, a MAC control element (MAC CE), or downlink control information (DCI).

22. The UE of claim 15, wherein the UE is further configured to:
receive an indication of one or more discrete indexes of FD beamforming components, wherein the one or more discrete indexes corresponds to the restricted set of FD beamforming components.

23. The UE of claim 22, wherein the one or more discrete indexes includes consecutive indexes of the FD beamforming components.

24. The UE of claim 22, wherein the one or more discrete indexes includes nonconsecutive indexes of the FD beamforming components.

25. The UE of claim 22, wherein the UE is further configured to:
receive an indication of one or more discrete indexes by receiving a bitmap, wherein each bit having a first value in the bitmap corresponds to an index included in the one or more discrete indexes, and each bit having a second value in the bitmap corresponds to an index that is not included in the one or more discrete indexes.

26. The UE of claim 25, wherein the bitmap has a length of N bits, wherein N represents a number of subbands or a number of FD beamforming components included in a plurality of FD beamforming components, and the restricted set is a subset of the plurality of FD beamforming components.

27. The UE of claim 15, wherein the UE is further configured to:
  receive an indication of an index window including a start index and an end index, wherein the index window spans a number of consecutive indexes of the FD beamforming components, and the index window corresponds to the restricted set of FD beamforming components.

28. The UE of claim 15, wherein the UE is further configured to:
  receive an indication of an index window including a start index and a length value, wherein the index window spans a number of nonconsecutive indexes of the FD beamforming components, and the index window corresponds to the restricted set of FD beamforming components.

29. The UE of claim 15, wherein an FD beamforming component of the restricted set includes at least one of a discrete Fourier transform (DFT) vector or a discrete cosine transform (DCT) vector.

* * * * *